United States Patent [19]
Wakabayashi et al.

[11] Patent Number: 5,794,086
[45] Date of Patent: Aug. 11, 1998

[54] ROTATING INDICATOR POINTER TYPE DISPLAY APPARATUS

[75] Inventors: Hiroshi Wakabayashi, Yokohama; Daiki Tsukahara, Hiratsuka; Yoshihiro Takeuchi, Tokyo; Akio Nishizawa, Kawasaki; Jun Matsushima, Yokohama; Hiroyuki Tsuru, Tokyo, all of Japan

[73] Assignee: Nikon Corporation, Tokyo, Japan

[21] Appl. No.: 807,271

[22] Filed: Feb. 28, 1997

Related U.S. Application Data

[63] Continuation of Ser. No. 310,054, Sep. 19, 1994, abandoned.

[30] Foreign Application Priority Data

| Sep. 21, 1993 | [JP] | Japan | 5-235107 |
| Sep. 21, 1993 | [JP] | Japan | 5-235108 |
| Sep. 27, 1993 | [JP] | Japan | 5-239736 |

[51] Int. Cl.$^6$ ............................................. G03B 17/18
[52] U.S. Cl. .......................... 396/284; 396/281; 396/286
[58] Field of Search ............................. 396/147, 281, 396/284, 285, 286, 293, 294; 116/284, 300; 368/69, 187, 188

[56] References Cited

U.S. PATENT DOCUMENTS

| 552,633 | 1/1896 | Esmond | 354/215 |
| 3,722,386 | 3/1973 | Furuta | 354/217 |
| 4,477,194 | 10/1984 | Michel et al. | 368/69 |
| 5,365,292 | 11/1994 | Wakabayashi et al. | 354/289.1 X |
| 5,521,671 | 5/1996 | Aoki et al. | 354/289.1 |

*Primary Examiner*—A. A. Mathews
*Attorney, Agent, or Firm*—Oliff & Berridge

[57] ABSTRACT

The display apparatus according to the present invention includes a display device which has a rotating indicator pointer and which displays information by rotationally driving the indicator pointer, an operating device which is capable of being operated in two manners for rotating the indicator pointer, and a drive control device which rotationally drives the rotating indicator pointer in the same rotational direction, whichever be the one of the two manners in which the operating device is operated.

21 Claims, 24 Drawing Sheets

FIG. 10
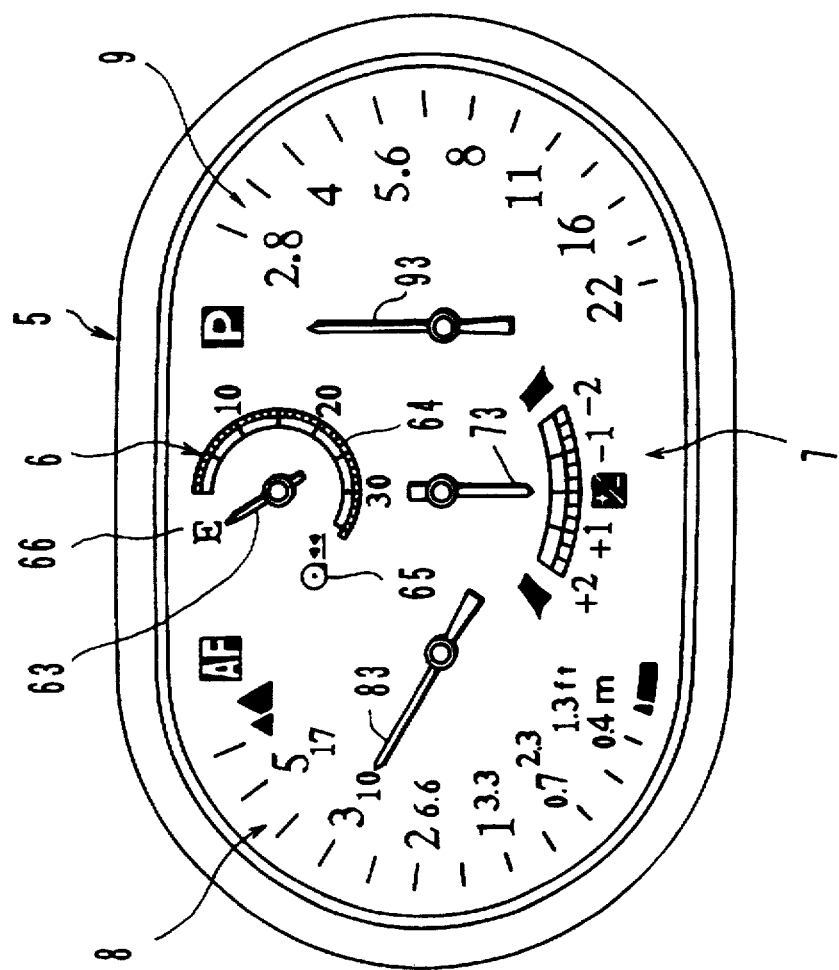
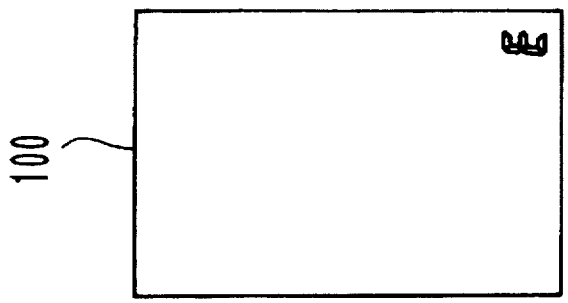

FIG. 25A
PULSE SIGNAL A 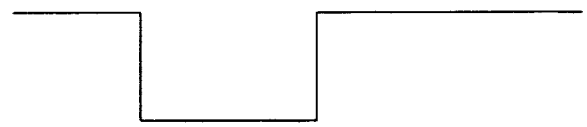
PULSE SIGNAL B 
FIG. 25B
PULSE SIGNAL A 
PULSE SIGNAL B 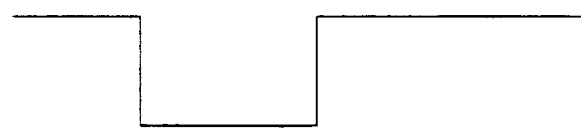

ROTATING INDICATOR POINTER TYPE DISPLAY APPARATUS

This is a continuation of application Ser. No. 08/310,054 filed Sep. 19, 1994, now abandoned.

BACKGROUND OF THE INVENTION

1. Field of the Invention

The present invention relates to a display apparatus of the rotating indicator pointer type which displays information by rotating an indicator pointer, and which may (for example) be provided to a camera.

2. Description of the Related Art

A camera provided with a display apparatus of the rotating indicator pointer type, which uses a rotating indicator pointer to display the current value of some item of information related to photography, such as for example film frame number or the like, is per se known; for example refer to U.S. patent application Ser. No. 08/161,084, which was abandoned in favor of application Ser. No. 08/438,247. This kind of display apparatus comprises a rotating indicator pointer which is rotationally driven by a rotational drive means such as a stepper motor or the like, and an indicator display or dial on which are inscribed various numerals or marks, typically along a path following the rotational path of the tip of the indicator pointer, which denote various values for the item of photographic information which is to be displayed. And the particular such inscribed value of this item of photographic information which it is intended to indicate is displayed to the camera user by the rotating indicator pointer being stopped in a position with its tip proximate to that inscribed value.

However, with prior art such display apparatus of the rotating indicator pointer type, the problem tends to occur in use that, because it is required to rotate the indicator pointer both forwards and also backwards, the construction of the drive circuit for the rotational drive means (such as a stepper motor) is complicated, which entails high cost and also increases the space occupied.

SUMMARY OF THE INVENTION

The primary objective of the present invention is to provide a display apparatus of the rotating indicator pointer type for a camera or the like, with which the operability and the display performance are not deteriorated, even though the construction is such that the indicator pointer is only rotated in one rotational direction.

It is a further objective of the present invention to provide such a display apparatus with good ergonomics.

It is a further objective of the present invention to provide such a display apparatus with which the compactness can be improved.

In order to attain these objectives, the present invention proposes a rotating indicator pointer type display apparatus comprising: a display device having a rotating indicator pointer, which displays information by rotationally driving said indicator pointer; an operating member which is capable of being operated in two manners for rotating said indicator pointer; and a drive control device which rotationally drives said rotating indicator pointer in the same rotational direction, whichever be the one of said two manners in which said operating member is operated.

Because the indicator pointer is only rotated in one particular direction whichever may be the rotational direction in which the operating member is operated, thereby it is possible to simplify the construction of the drive circuit for the indicator pointer, as compared with the prior art case in which it was necessary to rotate the indicator pointer in both rotational directions, and thereby the cost can be reduced and the compactness of the device can be enhanced. Further since it is guaranteed never to happen that the indicator pointer is not rotated even though the operating member is rotated, thereby the operability of this rotating indicator pointer type display apparatus is maintained as high, and no unpredictability or discomfort is ever caused for the user, since the ergonomics of the device are good.

BRIEF DESCRIPTION OF THE DRAWINGS

FIG. 10 is a figure showing the details of this second preferred embodiment of the rotating indicator pointer type display of the present invention, including the details of a liquid crystal type display;

FIGS. 25A and 25B are wave form diagrams showing the two pulse signals which are output by the above pulse generator;

DETAILED DESCRIPTION OF THE PREFERRED EMBODIMENTS

First Preferred Embodiment

The first preferred embodiment of the present invention will now be explained with reference to FIGS. 1 through 8.

In this embodiment, a pointer in a rotating indicator pointer type display is rotationally driven in a same rotational direction, whichever be the one of two direction in which a command member for driving the pointer is operated.

Figure 1:
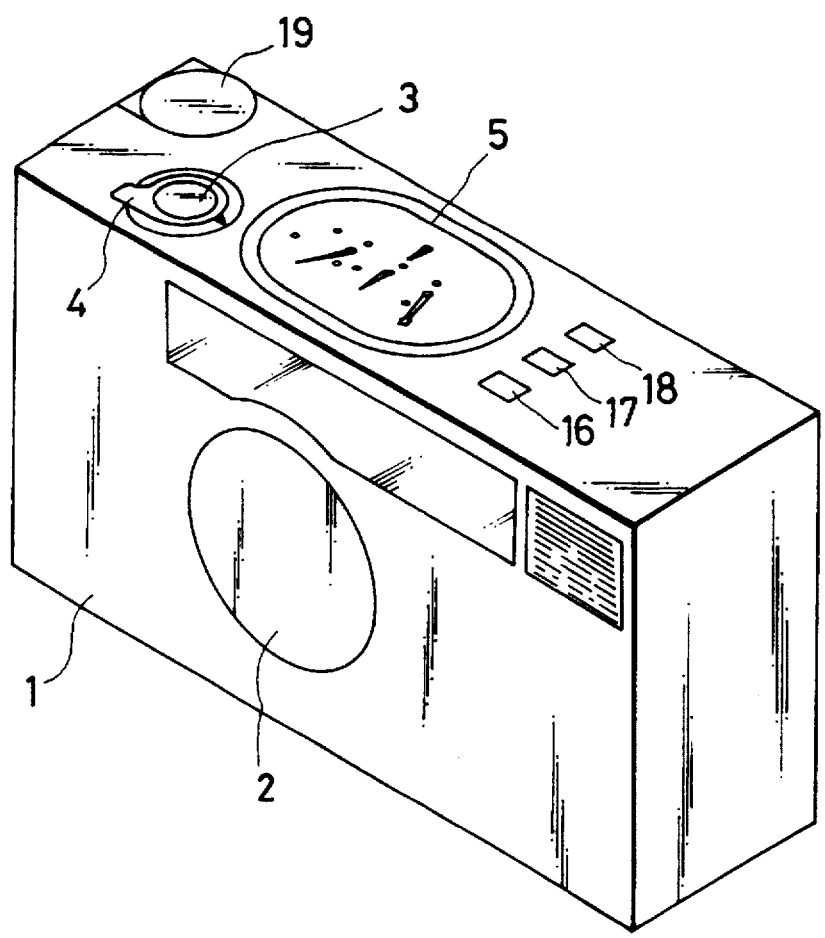
FIG. 1 is a perspective view of a camera which incorporates the first preferred embodiment of the rotating indicator pointer type display according to the present invention.

FIG. 1 is a perspective view of a camera which incorporates the first preferred embodiment of the display device according to the present invention. The reference numerals 1, 2, and 3 respectively denote a main body of the camera, a barrel of the photographic lens, and a release button. The reference numeral 4 denotes a mode selector of a dial type for selecting the exposure control mode for the camera, and this mode selector 4 is rotatable around the release button 3. When the indicator mark 4a (refer to FIG. 2) of the mode selector 4 points towards the portion of the camera main body 1 on which the legend "OFF" is inscribed, all operations of the camera are stopped. When the indicator mark 4a points towards the inscribed legend "P", a program exposure mode is set, in which both the shutter speed and the aperture value are determined automatically by the camera. When the indicator mark 4a points towards the inscribed legend "A", an aperture priority mode is set, in which the aperture value is determined by the camera user and then the shutter speed appropriate for this aperture value is determined automatically by the camera.

Figure 3:
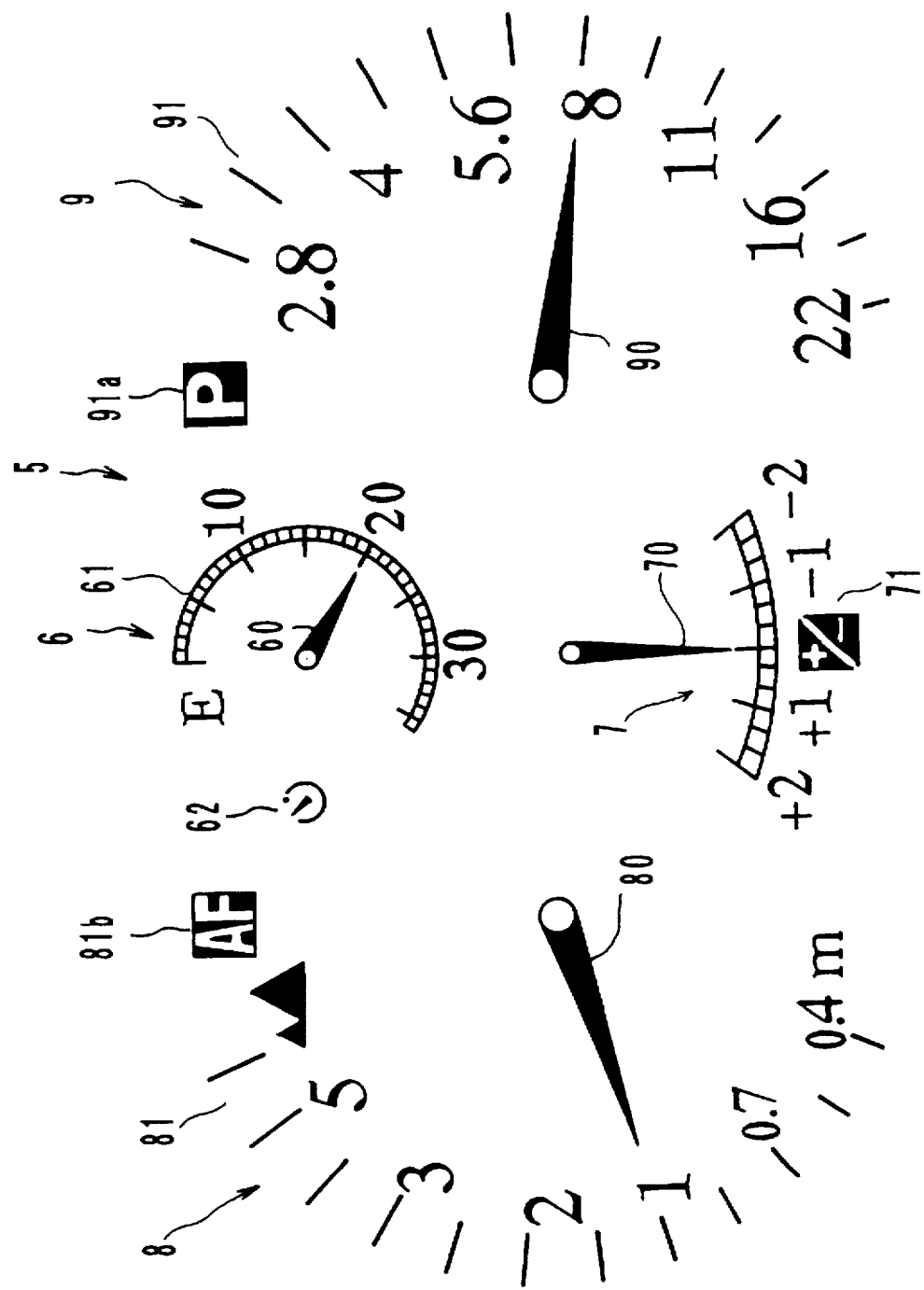
FIG. 3 is a figure showing the details of this first preferred embodiment of the rotating indicator pointer type display apparatus of the present invention.

The reference numeral 5 denotes a display device of the rotating indicator pointer type for displaying various sorts of photographic information, and as shown in FIG. 3, this display device 5 comprises a frame number display section 6 which displays the number of film frames already photographed, an exposure compensation amount display section 7 which displays the amount of exposure compensation which is applied, a photographic distance display section 8 which displays photographic distance information, and an aperture value display section 9 which displays aperture value information. In the frame number display section 6, the number of film frames already photographed is displayed by an indicator pointer 60 being rotated over a scale on a dial 61 to an angular position which corresponds to the actual current value of film frame number. At the position towards the dial 61, a self timer mark 62 which denotes a self timer mode is setting is provided, and when the indicator pointer 60 points at this mark 62, the self timer mode is set. In the exposure compensation amount display section 7, the amount of exposure compensation is displayed by an indicator pointer 70 being rotated over a scale on a dial 71 to an angular position which corresponds to the actual current value of the amount of exposure compensation. And in the aperture value display section 9, during the aperture priority mode, the value of the aperture setting is displayed by an indicator pointer 90 being rotated over a scale on a dial 91 to an angular position which corresponds to the actual current value of the aperture, while during the program exposure mode the indicator pointer 90 is rotated to an angular position which corresponds to an indication "P".

In the photographic distance display section 8, photographic distance is displayed by an indicator pointer 80 being rotated to the position correspond to the photographic distance on a dial 81. A mark 81b consisting of "AF" is inscribed at the end of the scale on the dial 81 which is towards the front side of the camera.

On the upper surface of the camera main body there are provided a command knob 19 for setting various items of photographic information as photographic parameters, an AF mode button 16, a self timer mode button 17, and an exposure compensation mode button 18.

Figure 4:
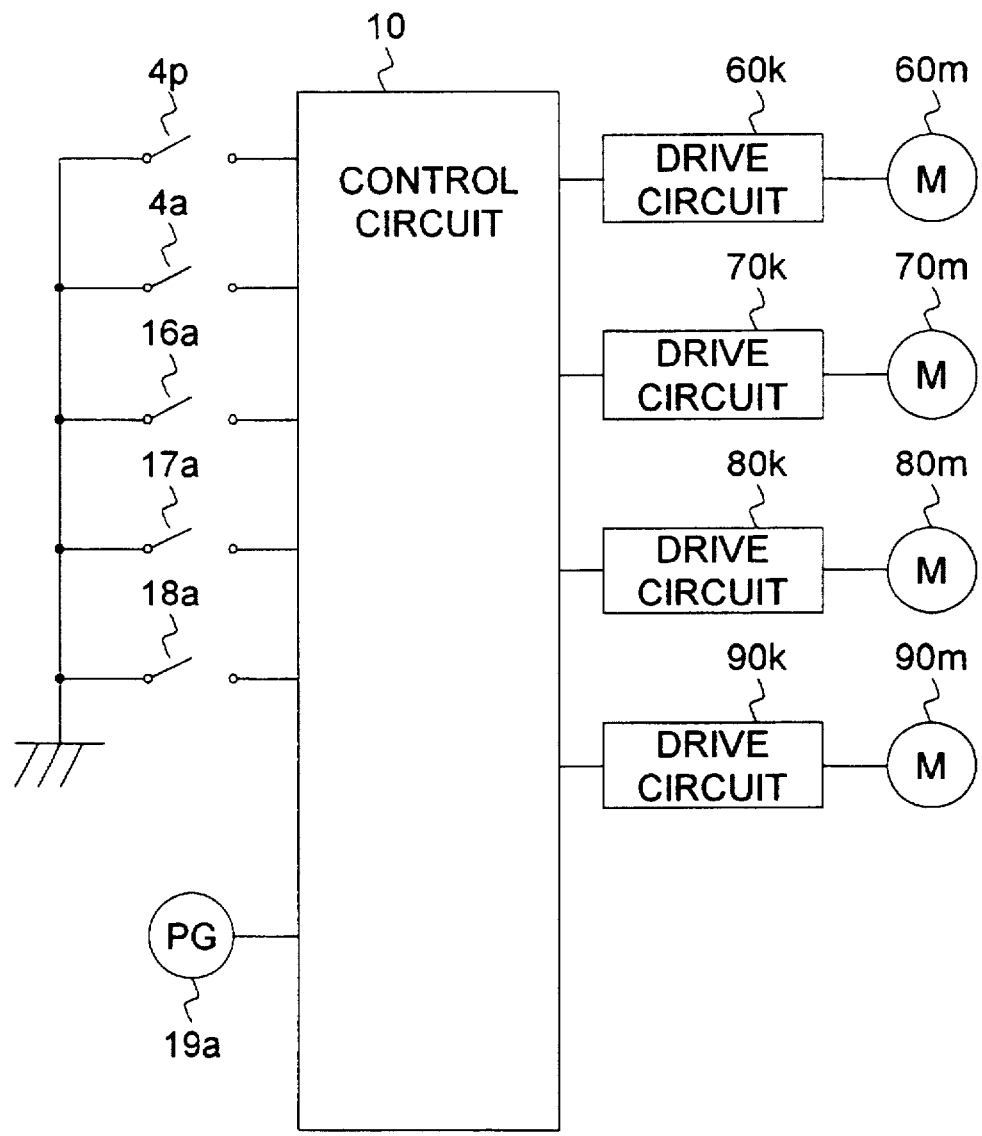
FIG. 4 is a block diagram showing the construction of the control system of the camera of FIG. 1.

The indicator pointers of the various above described display sections 6 through 9 are rotationally driven and controlled by the control device which is shown in block diagram form in FIG. 4.

To a control circuit 10 there are connected a switch 4a which is turned on when the indicator mark 4a on the mode selector 4 points at the legend "A", a switch 4p which is turned on when the indicator mark 4a on the mode selector 4 points at the legend "P", an AF mode switch 16a which is turned on when the AF mode button 16 is operated, a self timer mode switch 17a which is turned on when the self timer mode button 17 is operated, an exposure compensation mode switch 18a which is turned on when the exposure compensation mode button 18 is operated, and a pulse generator 19a which outputs a pulse signal in correspondence with the rotational direction and the amount of rotation of the command knob 19.

The pulse signal generated in the pulse generator 19a includes a rotational direction component which shows whether the command knob 19 has been rotated in the forward rotational direction or in the backward rotational direction, and a rotational amount component which shows the amount by which the command knob 19 has been rotated, in either direction To the control circuit 10 there are further connected a drive circuit 60k for a stepper motor 60m which drives the rotation of the indicator pointer 60 of the indicator portion 6, a drive circuit 70k for a stepper motor 70m which drives the rotation of the indicator pointer 70 of the indicator portion 7, a drive circuit 80k for a stepper motor 80m which drives the rotation of the indicator pointer 80 of the indicator portion 8, and a drive circuit 90k for a stepper motor 90m which drives the rotation of the indicator pointer 90 of the indicator portion 9.

Although the drive circuits 70k–90k rotate the motors 70m–90m respectively both in the forward rotational direction and the backward direction, the drive circuit 60k drives motor 60m only the forward rotational direction.

The control circuit 10 comprises a microcomputer and various associated circuitry, not particularly shown, and receives input of various information including information from the switches and from the pulse generator described above; and the control circuit 10 drives the rotation of the indicator pointers 60 through 90 of the display sections 6 through 9 by controlling the drive circuits 60k through 90k.

Next, referring to the flow charts shown in FIG. 5 through 8, the procedure followed by the control circuit 10 for controlling the driving of the various indicator pointers, according to the first preferred embodiment of the present invention, will be explained.

Figure 5:
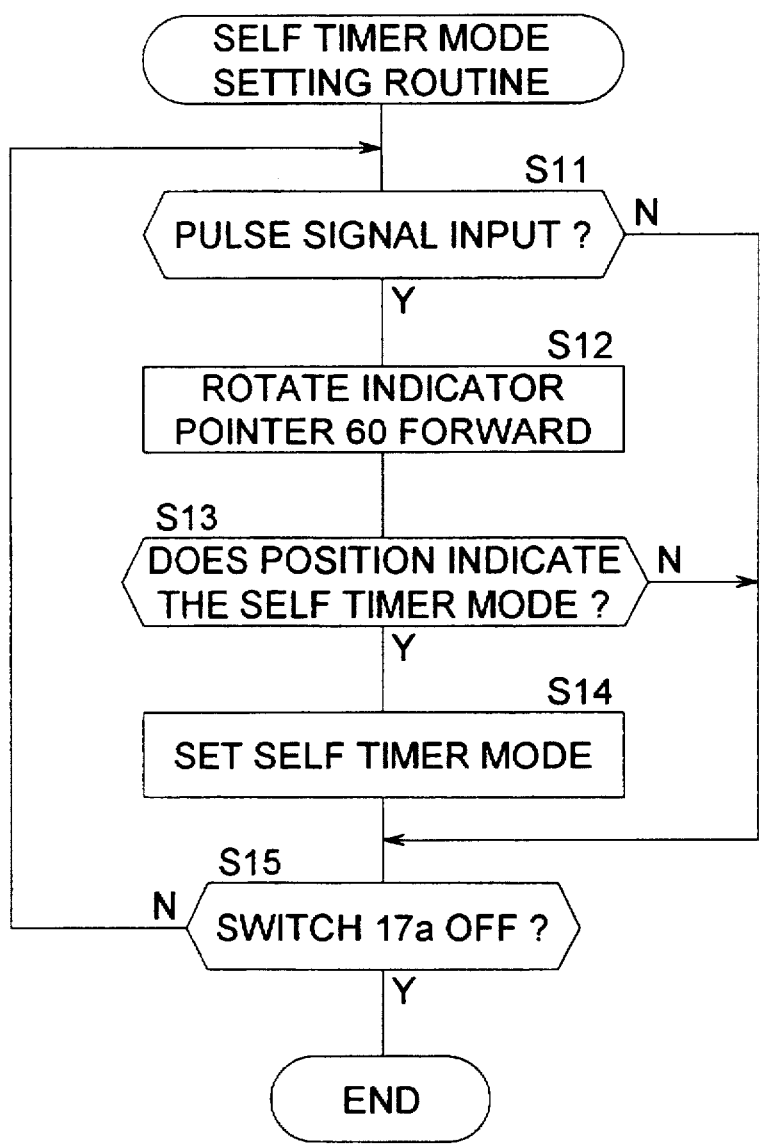
FIG. 5 is a flow chart for explanation of the operation of a self timer mode setting routine for this first preferred embodiment.

FIG. 5 is a flow chart which shows the operation of a self timer mode setting routine for this first preferred embodiment of the present invention.

The microcomputer incorporated in the control circuit 10 starts to execute this routine when the switch 17a is turned on by the camera user pressing the self timer mode button 17. In the step S11, a decision is made as to whether or not a pulse signal has been input from the pulse generator 19a, i.e. whether or not the command knob 19 has been operated. If the result of this decision is NO the flow of control is transferred to the step S15, while if the result of this decision is YES the flow of control is transferred to the step S12.

Figure 2:
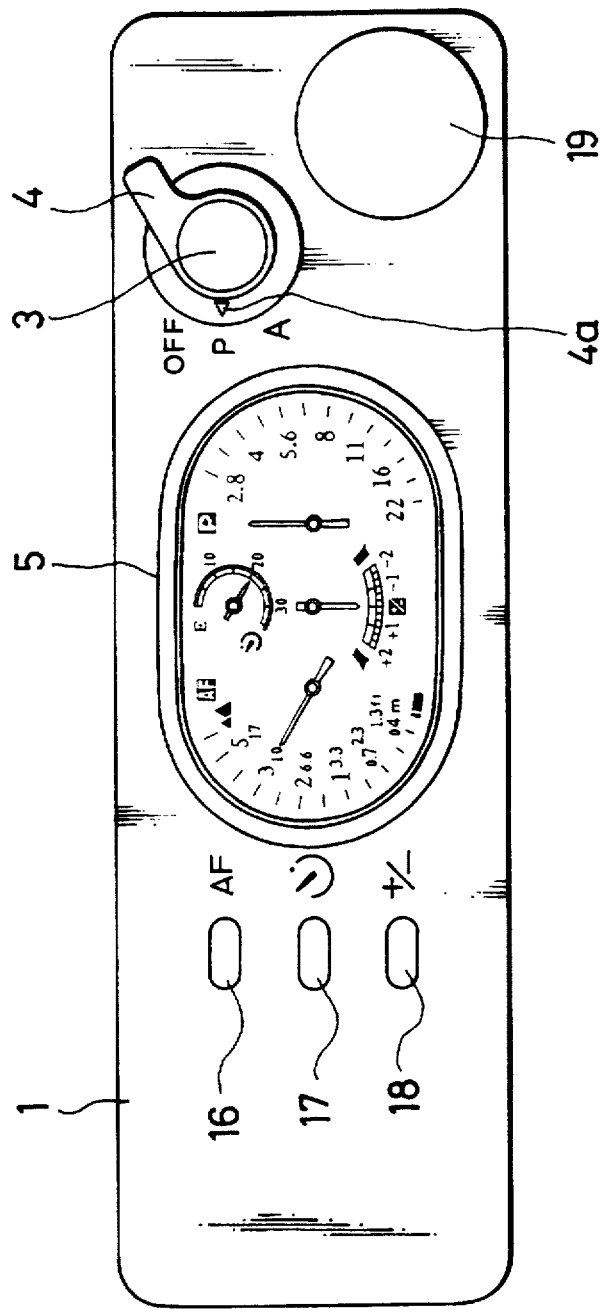
FIG. 2 is a plan view of the camera of FIG. 1.

In the step S12, regardless of whether or not the pulse signal input is a forward or backward rotation signal, i.e. regardless of whether or not this pulse signal represents a rotation of the command knob 19 in the clockwise rotational direction as seen in FIG. 2 or in the anticlockwise rotational direction, the drive circuit 60 is controlled to rotate the motor 60m in its forward rotational direction, so that the indicator pointer 60 of the frame number display section 6 is rotated in the forward rotational direction. I.e., the indicator pointer 60 is rotated in the clockwise rotational direction as seen in FIG. 3. The amount of rotation of the indicator pointer 60 just corresponds to the absolute value of the amount of rotation of the command knob 19, i.e. does not depend upon the rotational direction in which the command knob 19 is turned but only upon the angle through which the command knob 19 is turned.

In the step S13, a decision is made as to whether or not the indicator pointer 60 has been rotated to its position which points at a symbolic mark 62 which denotes the self timer mode. If in this step S13 the result of the decision is NO then the flow of control is transferred to the step S15, while if the result of this decision is YES then the flow of control is transferred to the step S14. In the step S14, the self timer mode is set. And in the step S15 a decision is made as to whether or not the switch 17a is off, and if the switch 17a is off then this self timer mode processing routine terminates, while if the switch 17a is not off then the flow of control returns back to the step S11.

As described above, according to this first preferred embodiment of the present invention, when the command knob 19 is operated by being rotated while the self timer mode button 17 is kept depressed, the indicator pointer 60 of the frame number display section 6 is rotated in the clockwise rotational direction (its forward rotational direction), irrespective of the rotational direction in which the command knob 19 is rotated. Further, if the indicator pointer 60 is stopped at its position pointing at the mark 62 which denotes the self timer mode, the self timer mode is set. In this manner, since the construction is such as to enable the indicator pointer 60 only to be rotated in a single rotational direction, thereby it is possible to simplify the construction of the drive circuit 60k for its drive motor, as compared with the prior art case in which an indicator pointer can be rotated in both rotational directions; and thereby the overall cost can be reduced. Furthermore, since the indicator pointer 60 is rotated in its forward rotational direction whether the command knob 19 is rotated in its forward rotational direction or in its backward rotational direction, it absolutely never happens that the indicator pointer 60 is not rotated although the command knob 19 is operated by being rotated, and therefore the photographer never feels uncomfortable with the operation of this rotating indicator pointer type display device, because the ergonomics thereof are good.

Furthermore, the film frame number is indicated by the indicator pointer 60 except for when setting the self timer mode, but, when this film frame number is being displayed, since the indicator pointer 60 can only be driven in its forward rotational direction from the symbol indicating the current film frame number, i.e. in its rotational direction to indicate film frame numbers which are greater than the actual film frame number, thereby no problem can arise, even though the construction is such that the indicator pointer 60 can be rotated only in one rotational direction the clockwise direction.

Figure 6:
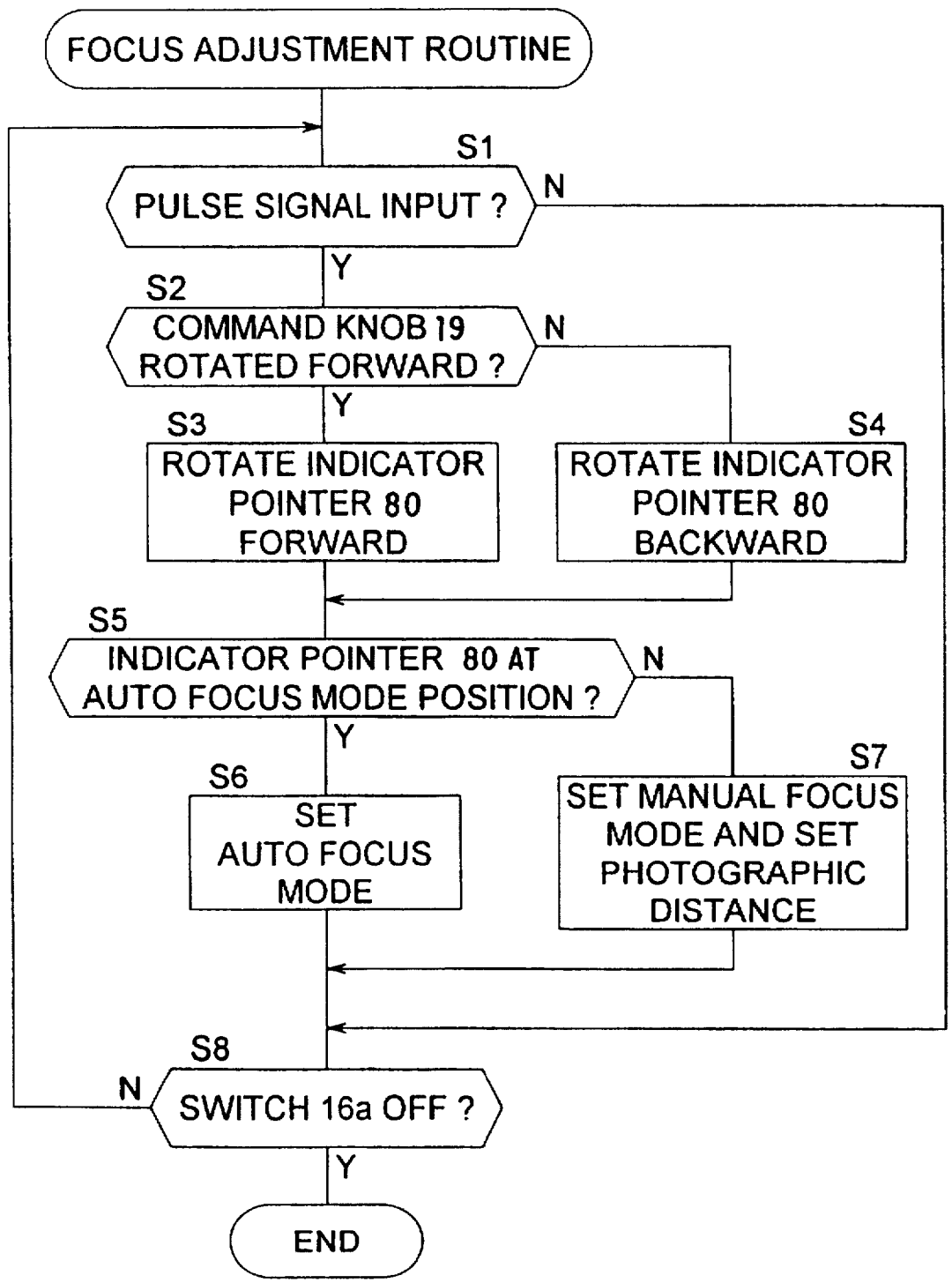
FIG. 6 is a flow chart for explanation of the operation of a focus adjustment routine for this first preferred embodiment.

FIG. 6 is a flow chart which shows the control routine for focus adjustment. The microcomputer incorporated in the control circuit 10 starts to execute this control routine when the switch 16a is turned on by the photographer actuating the AF mode button 16. In the step S1, a decision is made as to whether or not the command knob 19 has been actuated by being rotated in either direction, in other words as to whether or not a pulse signal has been input from the pulse generator 19a. If the result of this decision is YES the flow of control continues to the step S2, while if the result of this decision is NO the flow of control continues to the step S8.

In the step S2, a decision is made as to whether or not the rotational direction component included in this input pulse signal indicates rotation of the command knob 19 in the forward rotational direction. If the result of this decision is that the rotational direction is indeed the forward one, the flow of control continues to the step S3, and the indicator pointer 80 of the photographic distance display section 8 is rotated, via the drive circuit 80k, in the forward rotational direction (in the clockwise rotational direction) by an amount exactly corresponding to the rotational amount component included in the input pulse signal. On the other hand, if in the step S2 the result of the decision is that the rotational direction is not the forward one (i.e. is the backward one), the flow of control is transferred to the step S4, and the indicator pointer 80 of the photographic distance display section 8 is rotated, via the drive circuit 80k, in the backward rotational direction (in the anticlockwise rotational direction) by an amount exactly corresponding to the rotational amount component included in the input pulse signal.

In the step S5, a decision is made as to whether or not the indicator pointer 80 of the photographic distance display section 8 is currently pointing at the mark 81b which denotes the auto focus mode. If in this step S5 it is decided that the indicator pointer 80 is currently pointing at the mark 81b, the flow of control is transferred to the step S6 and the auto focus mode is set. On the other hand, if in this step S5 it is decided that the indicator pointer 80 is not currently pointing at the mark 81b, so that therefore the indicator pointer 80 is currently pointing at one or another of the marks on the scale of the dial of the photographic distance display section 8 from the mark "0.4" which denotes a distance of approximately 0.4 meters to the mark which denotes the forced infinite distance mode, then the flow of control is transferred to the step S7. In this step S7 the manual focus mode is set, and also the photographic distance is set to a distance corresponding to the mark on the scale of the dial of the photographic distance display section 8 at which the indicator pointer 80 is currently pointing. After the step S6.or S7, the flow of control is transferred to the step S8, and if the switch 16a is on, the flow of control returns to the step S1, while if the switch 16a is off, the execution of this routine terminates.

Moreover, in the auto focus mode, the distance to the object to be photographed is measured by a distance measurement device which is not shown in the figures, the photographic distance is set based upon the result of this distance measurement, and adjustment of the axial position of the focusing optical system of the photographic lens is performed upon the basis of this photographic distance. On the other hand, in the manual focus mode, the photographic distance is set corresponding to the position over the scale on its dial at which the indicator pointer 80 of the photographic distance display section 8 is positioned, and adjustment of the axial position of the focusing optical system of the photographic lens is performed upon the basis of this photographic distance.

With this first preferred embodiment of the present invention as described above, when the command knob 19 is rotated while the AF mode button 16 is being kept depressed, the indicator pointer 80 of the photographic distance display section 8 is rotated over the scale on its dial in the forward direction or backward direction, and the setting of the focusing mode or setting of the photographic distance is performed according to the angular position at which this indicator pointer 80 stops.

Figure 7:
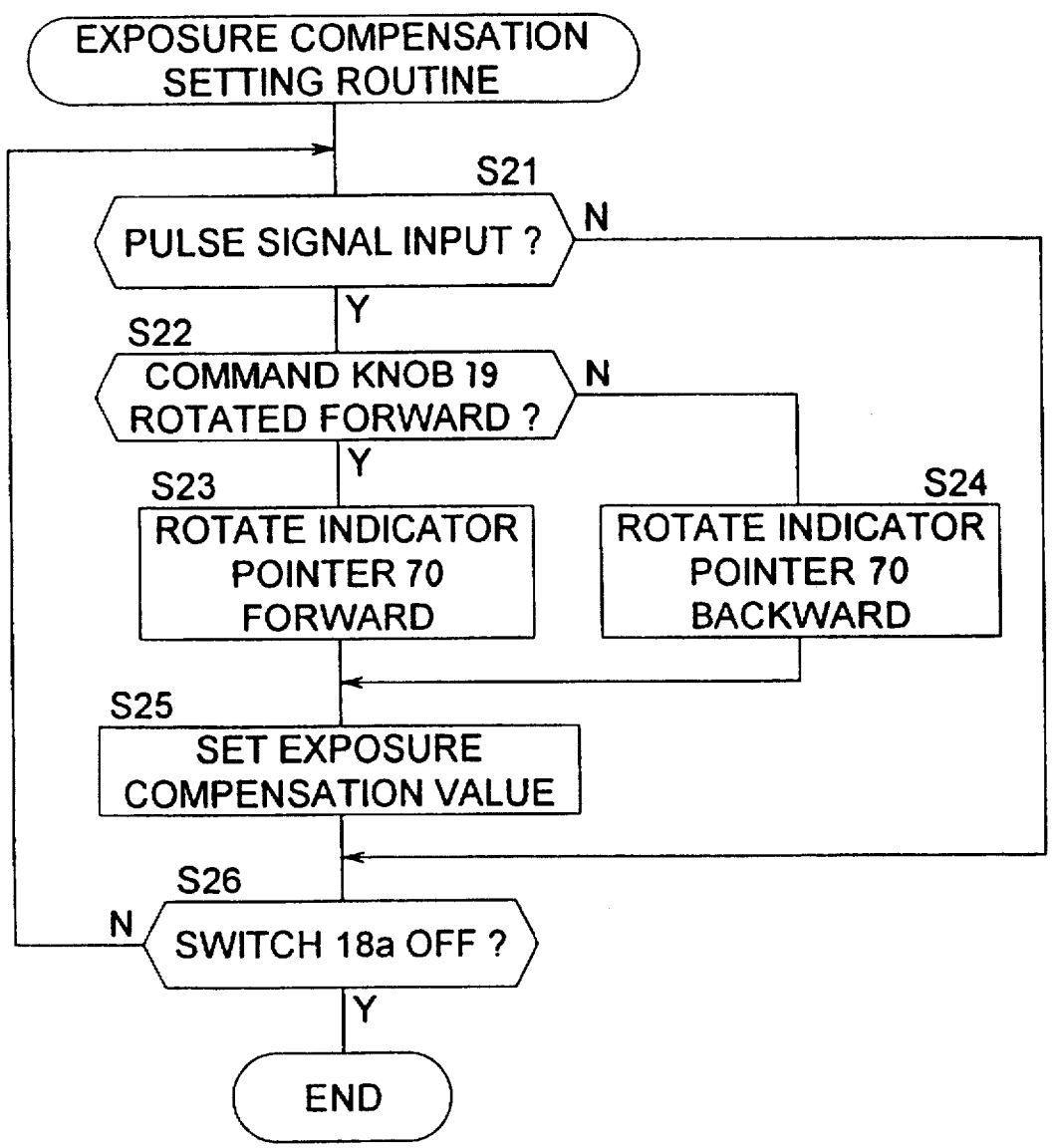
FIG. 7 is a flow chart for explanation of the operation of a exposure compensation routine for this first preferred embodiment.

FIG. 7 is a flow chart which shows the control routine for setting of the exposure compensation. The microcomputer incorporated in the control circuit 10 starts to execute this control routine when the switch 18a is turned on by the photographer actuating the exposure compensation button 18. In the step S21, a decision is made as to whether or not the command knob 19 has been actuated by being rotated in either direction, in other words as to whether or not a pulse signal has been input from the pulse signal generator 19a. If the result of this decision is NO, flow of control transferred to the step S26, while if the result of this decision is YES, flow of control is transferred to the step S22, in which a decision is made as to whether or not the rotational direction component included in this input pulse signal indicates rotation of the command knob 19 in the forward rotational direction. If the result of this decision is that the rotational direction is indeed the forward one, the flow of control continues to the step S23, and the indicator pointer 70 of the exposure compensation display section 7 is rotated, via the drive circuit 70k, in the forward rotational direction (in the clockwise direction) by an amount exactly corresponding to the rotational amount component included in the input pulse signal. On the other hand, if in the step S22 the result of the decision is that the rotational direction is not the forward one (i.e. is the backward one), the flow of control is transferred to the step S24, and the indicator pointer 70 of the exposure compensation display section 7 is rotated, via the drive circuit 70k, in the backward rotational direction (in the anticlockwise direction) by an amount exactly corresponding to the rotational amount component included in the input pulse signal. After the steps S23 or S24, the flow of control is transferred to the step S25, in which the exposure compensation value is set to a value corresponding to the mark on the scale of the dial of the exposure compensation display section 7 at which the indicator pointer 70 is currently pointing. In the step S26, a decision is made as to whether or not the switch 18a is being off, and if the switch 18a is on, the flow of control is transferred back to the step S21, while if the switch 18a is off, the execution of this routine terminates.

With this first preferred embodiment of the present invention as described above, when the command knob 19 is rotated while the exposure compensation button 18 is being kept depressed, the indicator pointer 70 of the exposure compensation display section 7 is rotated over the scale on its dial, and the setting of the exposure compensation value is performed according to the angular position at which this indicator pointer 70 stops.

Figure 8:
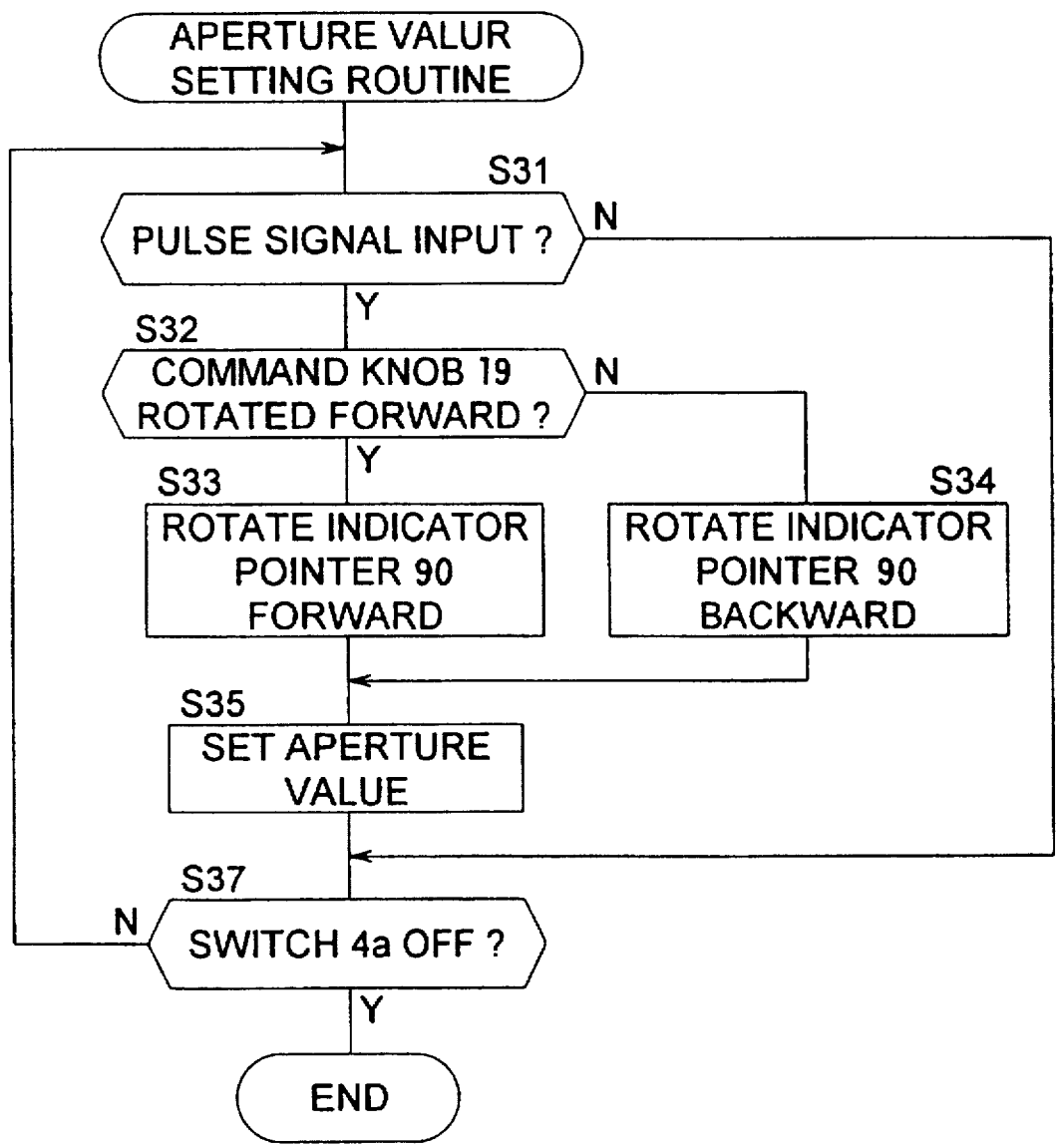
FIG. 8 is a flow chart for explanation of the operation of an aperture value setting routine for this first preferred embodiment.

FIG. 8 is a flow chart which shows the control routine for setting of the aperture value. The microcomputer incorporated in the control circuit 10 starts to execute this control routine when the switch 4a is turned on by the photographer actuating the mode selector 4 so as to set it to its "A" position which denotes the aperture priority exposure mode. In the step S31, a decision is made as to whether or not the command knob 19 has been actuated by being rotated in either direction, in other words as to whether or not a pulse signal has been input from the pulse signal generator 19a. If the result of this decision is NO, flow of control is transferred to the step S37, while if the result of the decision is YES, flow of control is transferred to the step S32. In the step S32 a decision is made as to whether or not the rotational direction component included in this input pulse signal indicates rotation of the command knob 19 in the forward rotational direction. If the result of this decision is that the rotational direction is indeed the forward one, the flow of control continues to the step S33, and the indicator pointer 90 of the aperture value display section 9 is rotated, via the drive circuit 90k, in the forward rotational direction by an amount exactly corresponding to the rotational amount component included in the input pulse signal. On the other hand, if in the step S32 the result of the decision is that the rotational direction is not the forward one (i.e. is the backward one), the flow of control is transferred to the step S34, and the indicator pointer 90 of the aperture value display section 9 is rotated, via the drive circuit 90k, in the backward rotational direction by an amount exactly corresponding to the rotational amount component included in the input pulse signal. After the steps S33 or S34, the flow of control is transferred to the step S35, in which the aperture value is set to a value corresponding to the mark on the scale of the dial of the aperture value display section 9 at which the indicator pointer 90 is currently pointing. In the step S37 a decision is made as to whether or not the switch 4a is off. If the switch 4a is off, the execution of this routine terminates, while if the switch 4a is on, flow of control is transferred back to the step S31.

With this first preferred embodiment of the present invention as described above, after the mode selector 4 has been set to its "A" position which denotes the aperture priority exposure mode, when the command knob 19 is rotated, the indicator pointer 90 of the aperture value display section 9 is rotated over the scale on its dial, and the setting of the aperture value is performed according to the angular position at which this indicator pointer 90 stops.

Although, as described above, in this first preferred embodiment of the present invention the display section of which the indicator pointer can only be rotated in a single rotational direction (no matter in which rotational direction the operating devices therefor may be rotated) is that display section which displays the film frame number and the self timer mode setting, nevertheless this is not intended to be limitative of the present invention, and it could also be arranged that the indicator pointers of some or all of the other display sections could be rotated only in one rotational direction. Further, although the construction was such that the indicator pointer was rotated through a rotational amount which corresponded to the amount through which a command knob was rotated, as an alternative, instead of a command knob, it would be possible to utilize (for example) a slide operating device which could be slid to and fro in either of two possible sliding directions. Yet further, it would also fall within the ambit of the present invention to provide two buttons as operating devices, a button which commanded forward rotation and a button which commanded backward rotation; and in the display device in which the indicator pointer can rotates only in a single rotational direction, irrespective of which of these buttons was pressed, it would be arranged that the indicator pointer would be rotated in the same rotational direction. And, yet further, the display device of the present invention is not to be considered as limited in its field of application to a camera, but may be utilized in various other contexts.

Second Preferred Embodiment

The second preferred embodiment of the present invention will now be explained with reference to FIGS. 9 through 17. Elements which are substantially identical in construction and function to ones of the first preferred embodiment described above are designated by the same reference symbols, and the explanation will concentrate upon the points in which this second preferred embodiment differs from the first.

In this second preferred embodiment, the indicator pointer of the rotating indicator pointer type display device rotates in one rotational direction only, and thereby is caused to indicate the current film frame number, the fact that the film is being rewound, and the like.

Figure 9:
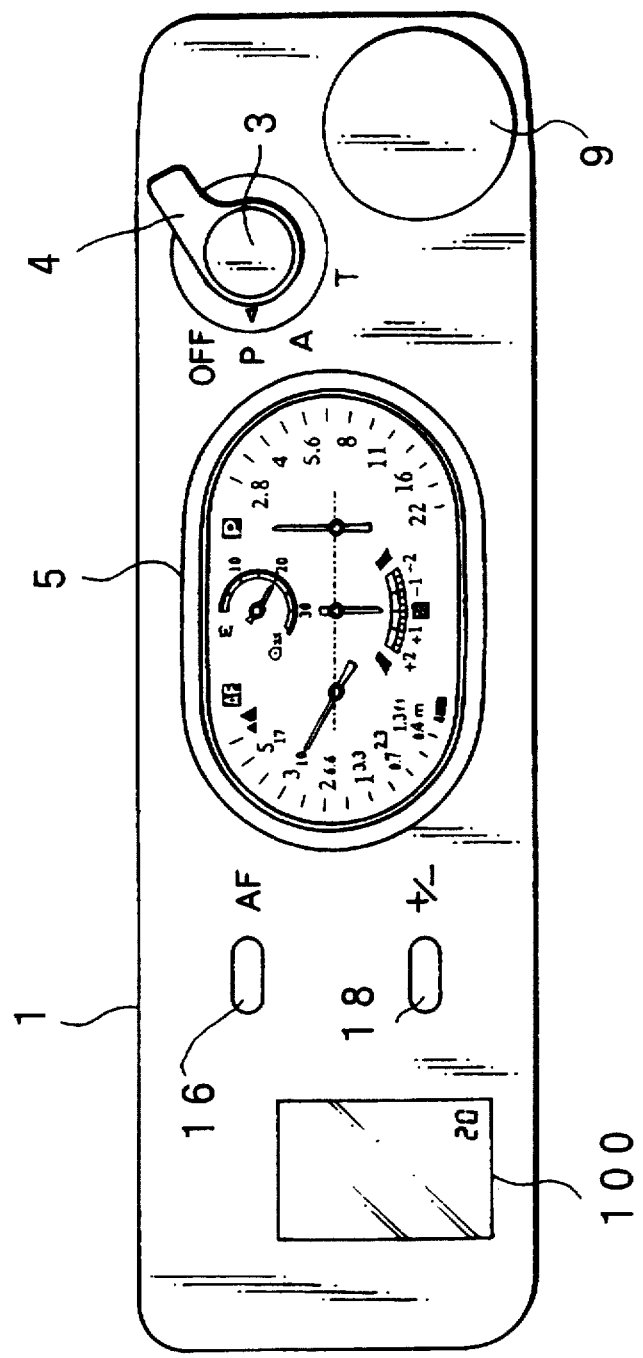
FIG. 9 is a plan view of a camera which incorporates the second preferred embodiment of the rotating indicator pointer type display according to the present invention.

FIG. 9 is a plan view of a camera which incorporates this second preferred embodiment. Referring to this figure, the reference numeral 1 denotes the main body of the camera, and upon this main body 1 there is provided a liquid crystal type display device 100 which displays the current film frame number (the number of film frames already photographed) digitally. A mode selector 4 can be rotatably actuated so as to be set to positions in which a projection 4a thereof points at legends "P", "A", or "T", and when this projection 4a is pointing at the legend "T" the time exposure mode is set. This time exposure mode is a photographic mode in which, in order to open the shutter of the camera, the photographer presses the release button of the camera all the way to its second stroke position and then releases it; and subsequently the shutter remains open until for a second time the photographer presses the release button of the camera all the way to its second stroke position and then releases it.

Further, the construction of the rotating indicator pointer type display device 5 is somewhat different from the construction in the case of the first preferred embodiment of the present invention described above. Referring to FIG. 10 in which the details of this display device 5 are shown, in the film frame number display section 6, instead of the mark 62 of the first preferred embodiment which denoted the self timer mode (refer to FIG. 3), there is provided a symbolic mark 65 which denotes the fact that the film is being rewound. Further, there is also provided a mark 66 consisting of the character "E", which denotes the fact that no film is currently loaded in the camera. And also, in this second preferred embodiment, the scale of the photographic distance display section 8 is graduated in feet as well as in meters.

Figure 11:
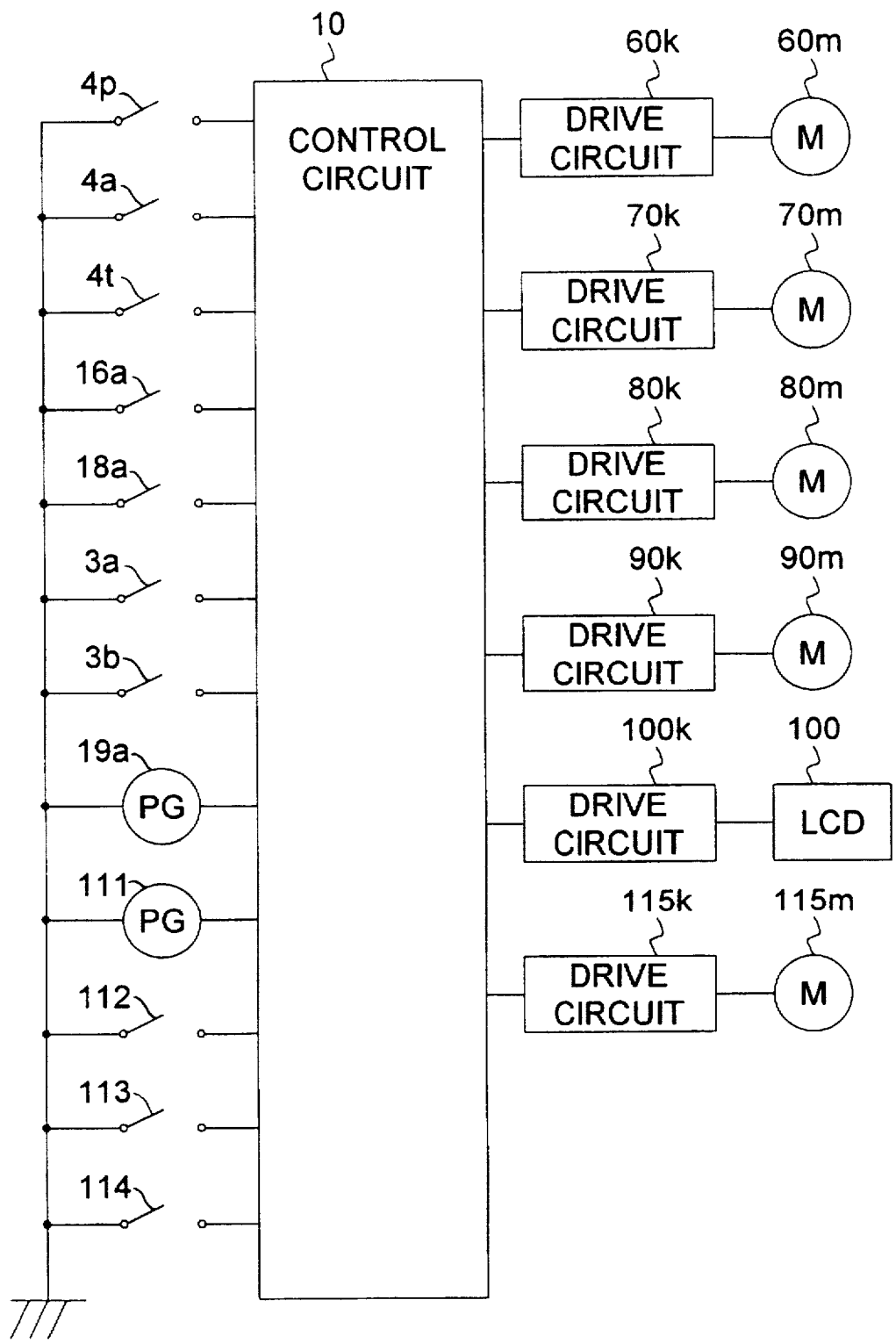
FIG. 11 is a block diagram showing the construction of the control system of the camera of FIG. 9 incorporating the second preferred embodiment.

FIG. 11 is a block diagram showing the control system of this camera incorporating the second preferred embodiment. To a control circuit 10, as well as the various switches 4a, 4p, 16a, and 18a which function in the same manner as the corresponding switches in the first preferred embodiment described above, there are also connected a switch 4t which is turned on when the projection 4a of the mode selector 4 is pointing at the legend "T", a first stroke switch 3a which is turned on when the release button 3 of the camera is partially depressed as far as a first stroke position thereof, a second stroke switch 3b which is turned on when the release button 3 of the camera is depressed all the way as far as a second stroke position thereof, a manual film rewind switch 112 which is turned on when a manual film rewind button not shown in the figures is operated by the camera user, a film loaded detection switch 113 which is turned on when a film is loaded into the camera, and a lid closed switch 114 which is turned on when a lid (not particularly shown) of a cartridge chamber (also not shown) in which the film is loaded is closed.

To the control circuit 10, as well as the various drive circuits 60k through 90k and the pulse generator 19a which function in the same manner as the corresponding elements in the first preferred embodiment described above, there are also connected a drive circuit 100k which drives the liquid crystal display device 100, a drive circuit 115k which drives a film forwarding motor 115m, and a pulse generator 111. This pulse generator 111 outputs a pulse signal which represents the rotational direction and the amount of rotation of a sprocket (not particularly shown) which rotates as the film is forwarded by the film forwarding motor 115m, and the direction in which the film is being forwarded and the amount by which it is forwarded are detected based upon this pulse signal.

Next, referring to the flow charts shown in FIGS. 12 through 14, the control procedures followed by the control circuit 10 according to the second preferred embodiment of the present invention will be explained.

Figure 12:
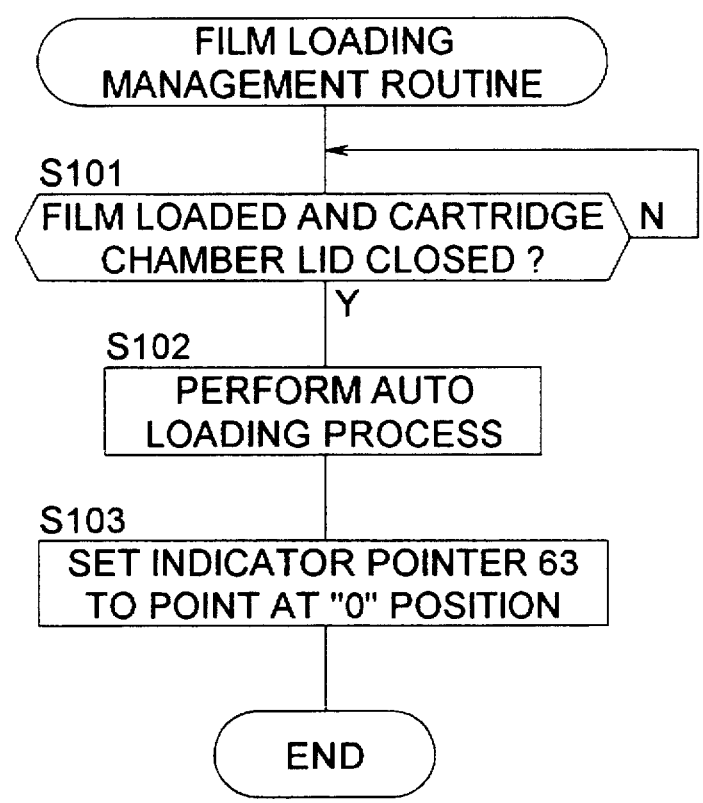
FIG. 12 is a flow chart for explanation of the operation of a film loading management routine for this second preferred embodiment.

The control circuit 10 starts to execute the film loading management control routine whose flow chart is shown in FIG. 12 when the film loaded detection switch 113 is turned off by the camera user removing a film cartridge from the cartridge chamber of the camera. In the first step S101, a decision is made as to whether or not both the film loaded detection switch 113 and also the lid closed switch 114 are on, i.e. as to whether or not a film is loaded into the camera and also the lid of the film cartridge chamber is closed; and if the result of this decision is NO then the flow of control loops back to this step S101, to wait until this condition is satisfied. When it is the case that both of the switches 113 and 114 are on, the flow of control proceeds to the step S102, in which the film forwarding motor 115m is driven via its drive circuit 115k so as to perform the film auto loading process. In the step S103, the motor 60m is driven via its drive circuit 60k so as to rotate the indicator pointer 63 of the film frame number display section 6, which was pointing at the camera empty mark 66, forwards in the clockwise rotational direction as seen in FIG. 10, so that it now points at the point on the dial 64 which denotes "0", whereby the film frame number display section 6 is caused to display a film frame number of zero; and also the liquid crystal display device 100 is driven via its drive circuit 110k so as to display the digit "0", and thereafter this control routine terminates.

Figure 13:
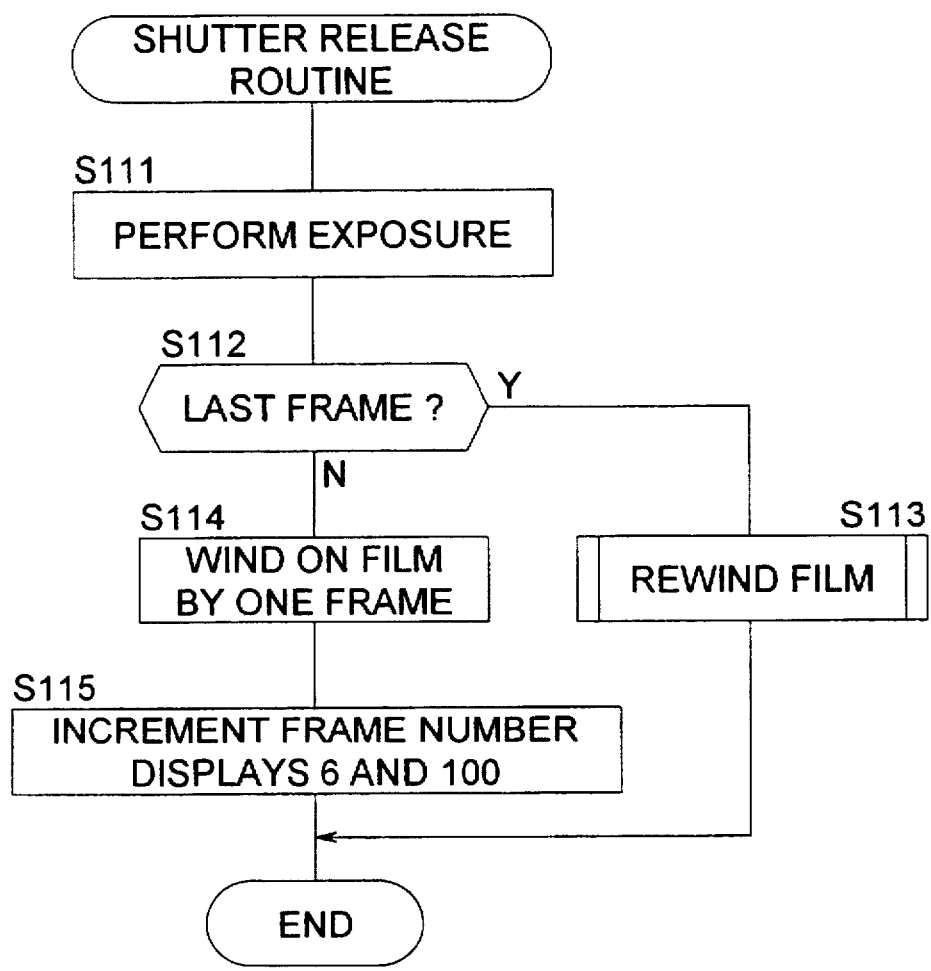
FIG. 13 is a flow chart for explanation of the operation of a shutter release processing routine for this second preferred embodiment.
Figure 15:
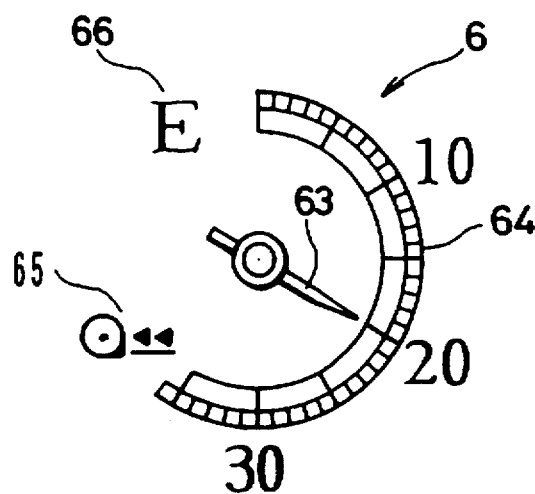
FIG. 15 is a figure showing an exemplary display provided by a film frame number display section incorporated in this second preferred embodiment.

The control circuit 10 starts to execute the shutter release control routine whose flow chart is shown in FIG. 13 when the second stroke switch 3b is turned on by the camera user depressing the release button 3 of the camera all the way as far as the second stroke position thereof. In the step S111 a shutter mechanism not particularly shown in the figures is operated so as to perform the exposure process. In the step S112 a decision is made as to whether or not the film frame which has just been shot is the last frame on the film, and if the last film frame has indeed just been shot then the flow of control is transferred to the step S113 in which a film rewinding process which will be described hereinafter is performed, and thereafter this control routine terminates. On the other hand, if the film frame which has just been shot is not the last frame on the film, then the flow of control is transferred to the step S114, in which the film forwarding motor 115m is driven via its drive circuit 115k so as to wind on the film by just the amount which corresponds to one film frame. In the step S115, the motor 60m is driven via its drive circuit 60k so as to rotate the indicator pointer 63 of the film frame number display section 6 forwards in the clockwise rotational direction as seen in FIG. 10 by a rotational amount just corresponding to the distance on the dial 64 which denotes a single film frame, so that the frame number which is being displayed by the film frame number display section 6 is increased by unity. Further, in this step, also the liquid crystal display device 100 is driven via its drive circuit 100k so as to display a number incremented by unity from the value which it previously displayed, and thereafter this control routine terminates. FIG. 15 shows by way of example the case in which the film frame number display section 6 is displaying a film frame number of 20.

Figure 14:
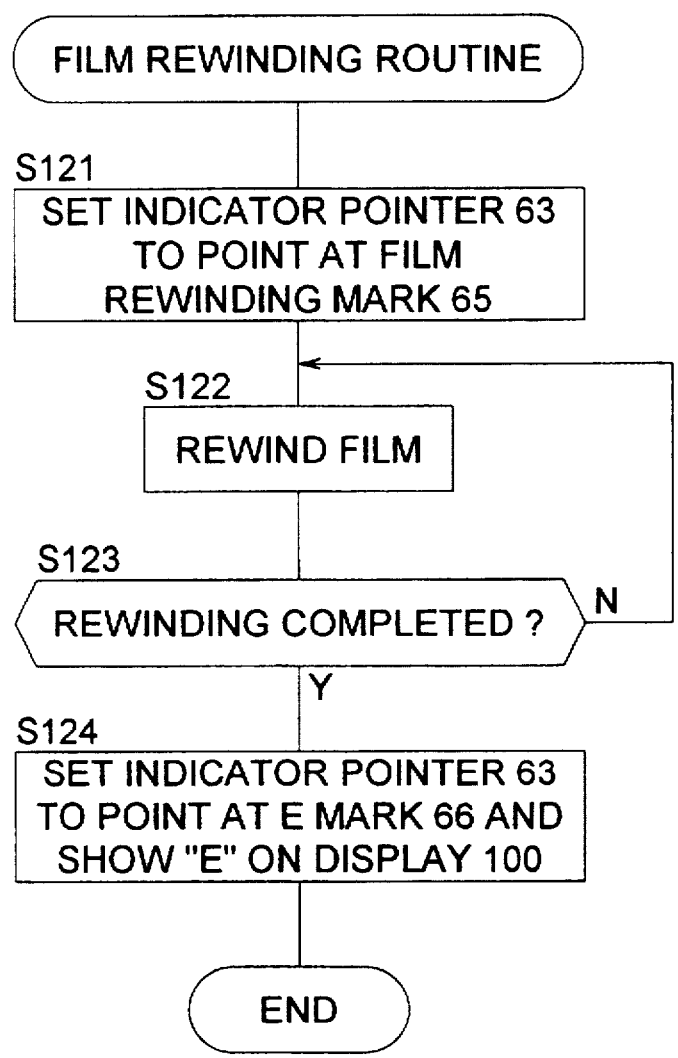
FIG. 14 is a flow chart for explanation of the operation of a film rewinding processing routine for this second preferred embodiment.
Figure 16:
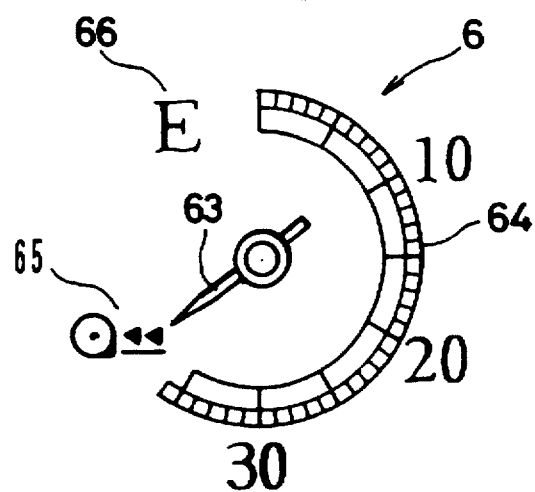
FIG. 16 is a figure showing a film rewinding in progress display being provided by this second preferred embodiment film frame number display section.
Figure 17:
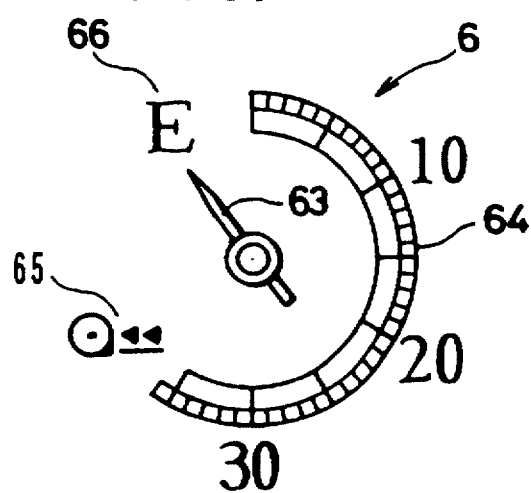
FIG. 17 is a figure showing a no film loaded display being provided by this second preferred embodiment film frame number display section.

When either the last film frame has been shot or the manual film rewind button (not shown) is operated by the camera user so that the manual film rewind switch 112 is turned on, the control circuit 10 starts to execute the film rewinding control routine whose flow chart is shown in FIG. 14. In the step S121, the motor 60 m is driven via its drive circuit 60k so as to rotate the indicator pointer 63 of the film frame number display section 6 forwards in the clockwise rotational direction as seen in FIG. 10 by a rotational amount sufficient to cause this indicator pointer 63 to point at the symbolic mark 65 which denotes the fact that the film is being rewound, as shown in FIG. 16. In the step S122, the film forwarding motor 115m is driven via its drive circuit 115k so as to rewind the film. In the step S123, a decision is made as to whether or not the rewinding of the film is yet complete, and if the film has now been completely rewound then the flow of control is transferred to the step S124 while if the film has not yet been completely rewound then the flow of control loops back to the step S122 to repeat the above described processing. In the step S124, the motor 60m is driven via its drive circuit 60k so as to rotate the indicator pointer 63 of the film frame number display section 6 forwards in the clockwise rotational direction as seen in FIG. 10 by a rotational amount sufficient to cause this indicator pointer 63 to point at the camera empty mark 66, as shown in FIG. 17. Further, in this step, also the liquid crystal display device 100 is driven via its drive circuit 100k so as to display the character "E" in order to indicate that the camera is empty, and thereafter this control routine terminates.

Since as described above, with this second preferred embodiment of the present invention also, the indicator pointer 63 of the film frame number display section 6 can only be driven in the one rotational direction, i.e. forwards, thereby it is possible to simplify the construction of the drive circuit 60k for its drive motor, as compared with the prior art case in which an indicator pointer can be rotated in both rotational directions; and thereby the overall cost can be reduced. Further, since the scale 64 for indicating film frame number, the symbolic film rewinding mark 65, and the "E" mark 66 are disposed in series in this order around the track which is followed by the tip of the indicator pointer 63 as it thus rotates, thereby unnecessary rotation of the indicator pointer 63 is avoided after the film has been rewound, and likewise after a new film has been loaded into the camera; so that the efficiency of operation is high. However, the particular arrangement disclosed above of the scale 64 for indicating film frame number, the symbolic film rewinding mark 65, and the "E" mark 66 is not to be considered as limitative of the present invention, but only as being a particular characteristic of the shown second preferred embodiment thereof.

With the second preferred embodiment of the present invention as disclosed above, the indicator pointer 63 of the film frame number display section 6 points at the symbolic film rewinding mark 65 while the film is being rewound, but as a variant embodiment it would alternatively be possible during film rewinding for the indicator pointer to show the remaining number of film frames, i.e. the number of film frames which have not yet been rewound, without departing from the principle of the present invention. This variant embodiment will now be described.

Figure 18:
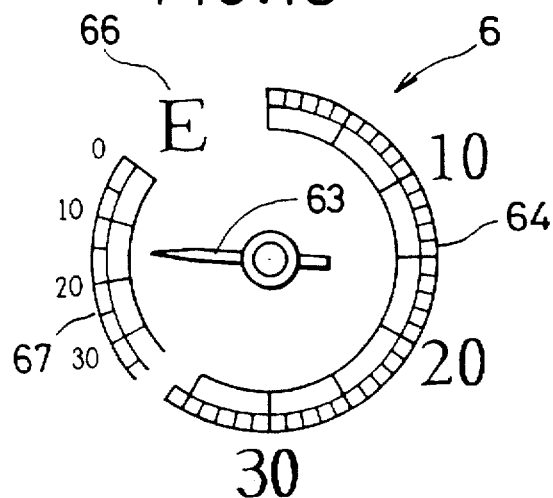
FIG. 18 is a figure showing an exemplary display upon another film frame number display section of a variant embodiment while film rewinding is taking place, showing the number of film frames remaining to be rewound.
Figure 19:
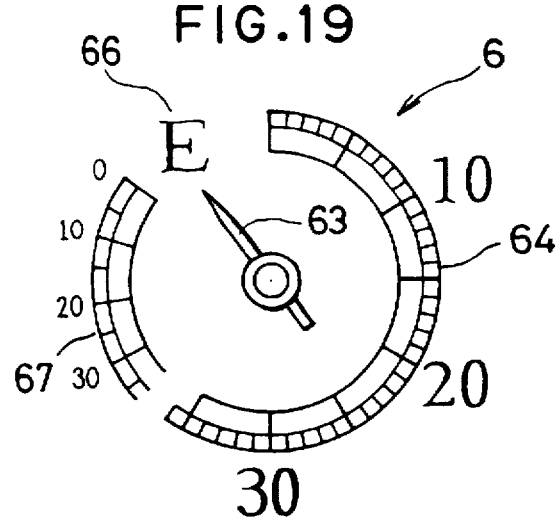
FIG. 19 is a figure showing an exemplary no film loaded display upon this film frame number display section of this variant embodiment.

In this variant, as shown in FIG. 18, the film frame number display section 6 is provided with a scale 67 which, during the film rewinding process, displays the number of film frames which have not yet been rewound, and the marks denoting film frame number upon this scale 67 decrease in the forward direction of rotation of the indicator pointer 63, i.e. in the clockwise direction. FIG. 18 exemplarily shows the condition of the film frame number display section 6 part way through the rewinding process for a film when fifteen film frames remain to be rewound; FIG. 19 shows the condition of the film frame number display section 6 after the film has been completely rewound; and FIG. 20 exemplarily shows the condition of the film frame number display section 6 part way through the utilization of a film when twenty film frames have been shot.

Figure 21:
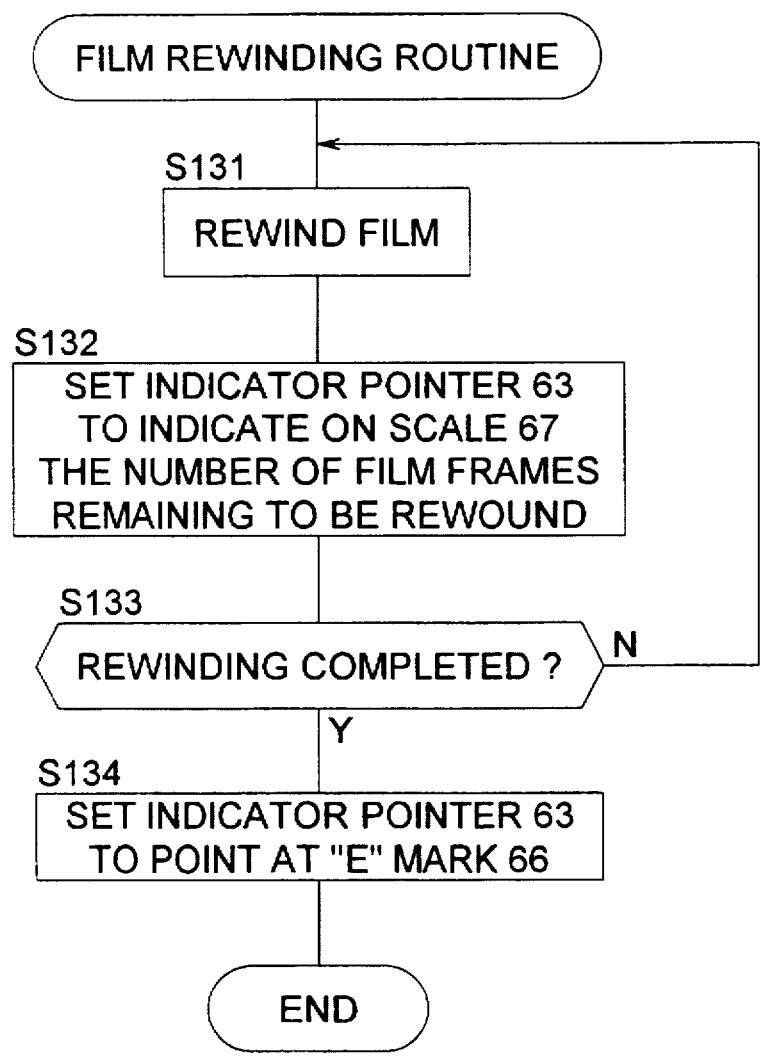
FIG. 21 is a flow chart for explanation of the operation of a film rewinding processing routine used in the operation of this variant embodiment film frame number display section.

FIG. 21 is a flow chart for explanation of the operation of a film rewinding control routine used in the operation of the film frame number display section of this variant embodiment during the film rewinding process for displaying the number of film frames which have not yet been rewound.

Figure 20:
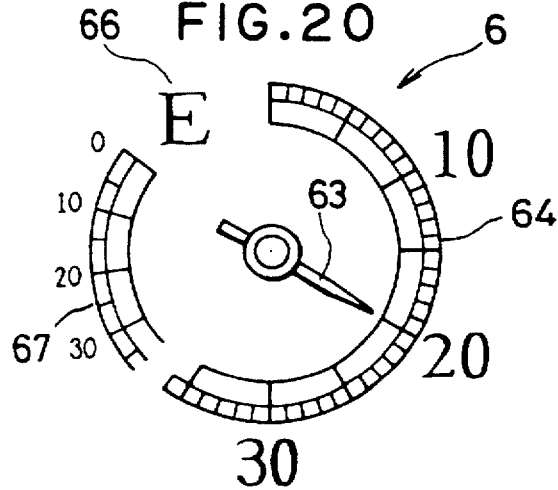
FIG. 20 is a figure showing an exemplary display upon this variant embodiment film frame number display section while a film is being utilized, indicating film frame number.

When either the last film frame has been shot or the manual film rewind button (not shown) is operated by the camera user so that the rewinding in progress switch 112 is turned on, the control circuit 10 starts to execute the film rewinding control routine whose flow chart is shown in FIG. 21. In the step S131, the film forwarding motor 115m is driven via its drive circuit 115k so as to start rewinding the film. In the step S132, the number of film frames remaining to be rewound is detected based upon the pulse signal generated by the pulse generator 111, and the motor 60m is driven via its drive circuit 60k so as to rotate the indicator pointer 63 of the film frame number display section 6 forwards in the clockwise rotational direction as seen in FIG. 20 by a rotational amount sufficient to cause this indicator pointer 63 to point at this number of remaining film frames upon the scale 67 of film frames remaining to be rewound. In the step S133, a decision is made as to whether or not the rewinding of the film is yet complete, and if the film has now been completely rewound then the flow of control is transferred to the step S134 while if the film has not yet been completely rewound then the flow of control loops back to the step S131 to repeat the above described processing. In the step S134, the motor 60m is driven via its drive circuit 60k so as again to rotate the indicator pointer 63 of the film frame number display section 6 forwards in the clockwise rotational direction as seen in FIG. 20 by a rotational amount sufficient to cause this indicator pointer 63 to point at the camera empty mark 66, as shown in FIG. 17, and thereafter this control routine terminates.

Third Preferred Embodiment

The third preferred embodiment of the present invention will now be explained with reference to FIGS. 22 through 27. Elements which are substantially identical in construction and function to ones of the first and second preferred embodiments described above are designated by the same reference symbols, and their description will be abbreviated, so that the explanation will concentrate upon the points in which this third preferred embodiment differs from the first and second preferred embodiments.

With this third preferred embodiment, as with the first and second preferred embodiments, irrespective of whether the command knob is rotated in its forward rotational direction or in its backward rotational direction, the indicator pointer is rotated in its forward rotational direction. However the angular amount through which the indicator pointer is rotated, for the same amount of angular movement of the command knob, is different for the two rotational directions of rotation of the command knob.

Figure 22:
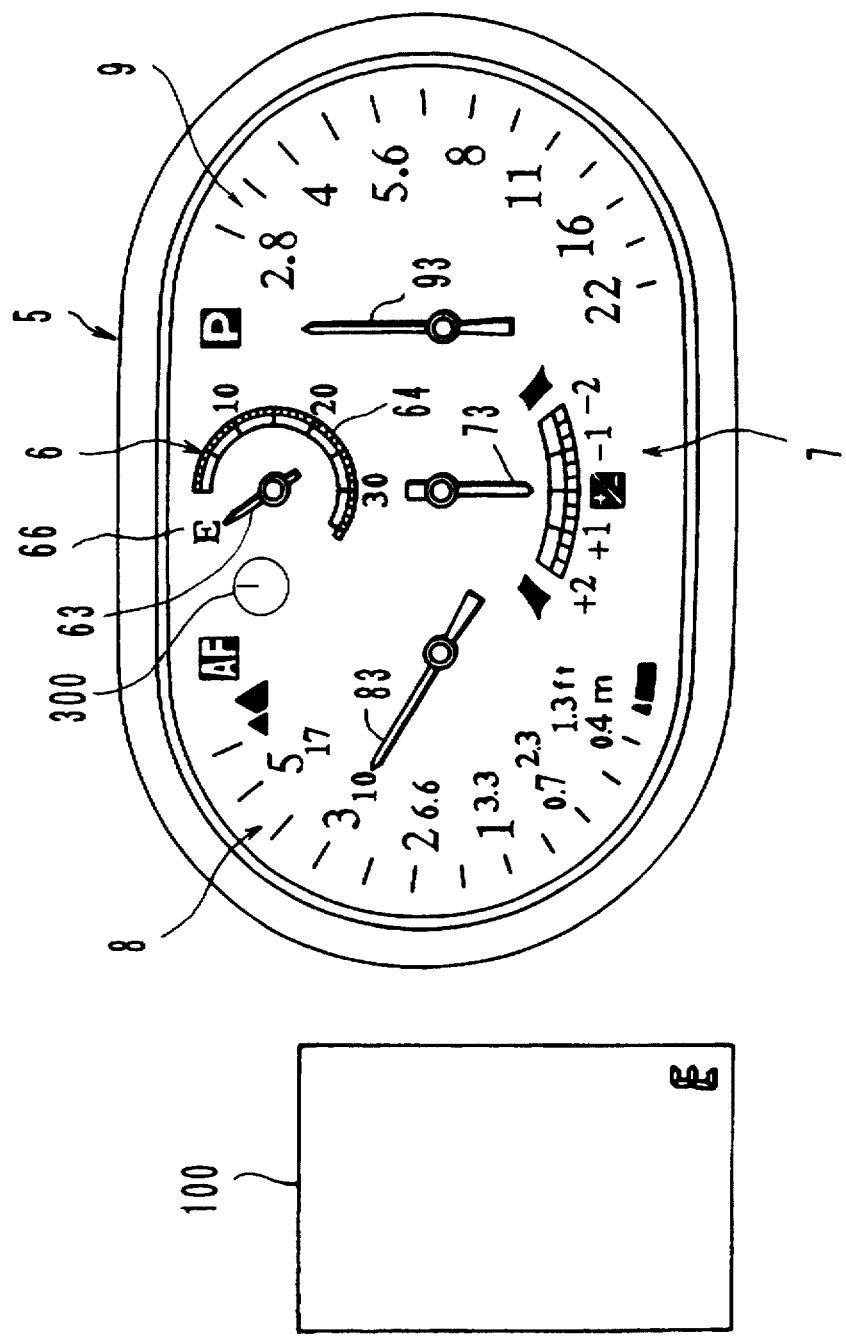
FIG. 22 is a figure showing a third preferred embodiment of the rotating indicator pointer type display of the present invention.
Figure 23:
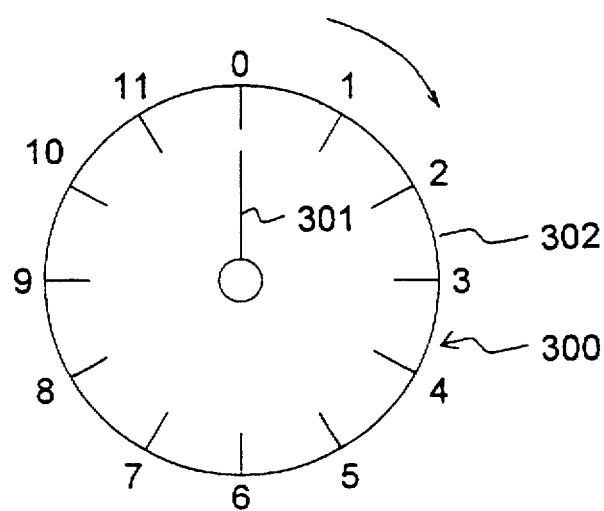
FIG. 23 is a figure showing the details of a self timer display section of the above display device.

With this third preferred embodiment, the construction of the camera is almost identical to that explained with regard to the case of the second preferred embodiment and shown in FIG. 9 etc. However, the construction of the rotating indicator pointer type display device 5 is somewhat different. As shown in FIG. 22, in this display device 5, between the film frame number display section 6 and the photographic distance display section 8 there is provided a self timer display section 300. This self timer display section 300, as shown in FIG. 23, comprises an indicator pointer 301 which is only capable of being rotated in the clockwise rotational direction and a dial 302 which is inscribed with the numbers "0" through "11" in a manner corresponding to a clock face, and the indicator pointer 301 is rotated over the dial 302 so that its tip indicates the number of photographic film frames for self timer photographic operation. When the indicator pointer 301 is rotated by the camera user so that its tip points at any number other than "0", this sets the self timer mode, and furthermore sets the number of self timer photographic film frames. For example, if the camera user rotates the indicator pointer 301 so as to point its tip at the number "3" on the dial 302, when subsequently he actuates the shutter release button of the camera, three self timer photographic film frames are automatically taken in succession. Furthermore, when the indicator pointer 301 is positioned so that its tip is pointing at the number "0", the self timer mode is not set.

Figure 24:
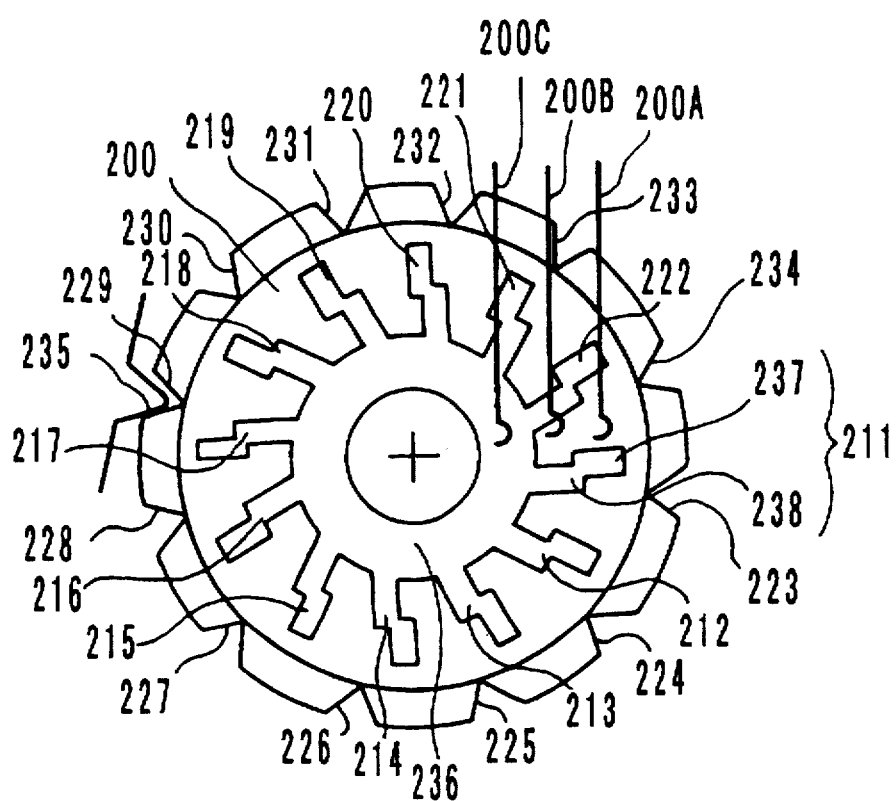
FIG. 24 is a figure showing the construction of a pulse generator which generates a pulse signal according to the operation of a command knob, in this third preferred embodiment of the present invention.

FIG. 24 shows the construction of a pulse generator 19a which outputs a pulse signal according to the operation of the command knob 19, in this third preferred embodiment of the present invention. The reference numeral 200 denotes a generally disk shaped rotating member which is formed integrally with the command knob 19 and which is made of an electrically insulating material, and on the lower surface of this rotating member 200 (the surface visible in the figure) there is adhered a plate 236 which is made of a metallic material. The plate 236 is generally of a circular shape, and around its circumference at an angular spacing of thirty degrees it is provided with twelve projecting portions, denoted by the reference numerals 211 through 222. Each of these twelve projecting portions 211 through 222 extends generally outwards in the radial direction, but is formed with a cranked portion or dogleg, so that its radially inward portion is staggered in the clockwise rotational direction relative to its radially outward portion. For example, the projecting portion 211 comprises a radially outward portion 237 and a radially inward portion 238 which are connected together by a dogleg portion, and as shown in the figure the radially inward portion 238 is more advanced in the clockwise rotational direction than the radially outward portion 237. And the outer peripheral edge of the rotating member 200 is formed with twelve "V" shaped notches denoted by the reference numerals 223 through 234 at an angular spacing of thirty degrees, each falling at an angular position generally between two neighboring ones of the projecting portions 211 through 222 of the plate 236, and a click spring 235 is disposed at the side of the rotating member 200 and is biased by its resilience so as to be engaged into one or another of these "V" shaped notches 223 through 234. Thereby, when the command knob 19 is rotated, this click spring 235 provides an indexing action therefor by engaging into the "V" shaped notches 223 through 234, and causes the command knob 19 and the plate 236 affixed thereto preferentially to stop with a clicking action into one of twelve rotational positions spaced apart at an angular spacing of thirty degrees.

The reference symbols 200A, 200B, and 200C denote three electrically conductive brushes which are fixed to an insulating base plate not shown in the drawing. The base plate is fixed in such a position, relative to the plate 236, that the tip portion of the brush 200A is located more radially outward than the tip portion of the brush 200B, which itself is located more radially outward than the tip portion of the brush 200C. The outer brush 200A is located so as to come into electrical contact with the radially outward portions such as the portion 237 of the twelve projecting portions 211 through 222 of the plate 236, while the middle brush 200B is located so as to come into electrical contact with the radially inward portions such as the portion 238 of these projecting portions 211 through 222; and the inner brush 200C is located so as to remain always in electrical contact with the inner disk shaped portion of the plate 236. The outer and middle brushes 200A and 200B are supplied with positive voltage from a voltage source not shown in the figure, while the inner brush 200C is grounded.

When the command knob 19 is rotated in the clockwise rotational direction as seen in FIG. 9, the rotating member 200 is rotated in the anticlockwise rotational direction as seen in FIG. 24, and the outer brush 200A comes into electrical contact successively with the radially outward portions such as the portion 237 of the twelve projecting portions 211 through 222 of the plate 236, while the middle brush 200B comes into electrical contact successively with the radially inward portions such as the portion 238 of the twelve projecting portions 211 through 222. When the outer brush 200A thus comes into contact with a radially outward portion of the plate 236 the voltage between this outer brush 200A and the inner brush 200C drops, and similarly when the middle brush 200B thus comes into contact with a radially inward portion of the plate 236 the voltage between this middle brush 200B and the inner brush 200C drops; and thereby, as shown in FIGS. 25A and 25B, pulse signals A and B are obtained. As will be understood from FIG. 25A, when the command knob 19 is thus rotated in the clockwise rotational direction, as each of the twelve projecting portions 211 through 222 approaches the brushes 200A and 200B, the outer brush 200A comes into electrical contact with the radially outward portion thereof somewhat before the middle brush 200B comes into electrical contact with the radially inward portion thereof, so that accordingly the pulse signal A leads the pulse signal B somewhat, as shown in FIG. 25A. On the other hand, when the command knob 19 is rotated in the anticlockwise rotational direction as seen in FIG. 9, the rotating member 200 is rotated in the clockwise rotational direction as seen in FIG. 24, and, as each of the twelve projecting portions 211 through 222 approaches the brushes 200A and 200B, the outer brush 200A comes into electrical contact with the radially outward portion thereof somewhat after the middle brush 200B comes into electrical contact with the radially inward portion thereof, so that accordingly the pulse signal A trails the pulse signal B somewhat, as shown in FIG. 25B.

Since in this manner the output timing of the pulse signals A and B differs according to the direction in which the command knob 19 is rotated, it is possible to detect the direction of rotation of the command knob 19 from this output timing. Further, since the twelve projecting portions 211 through 222 are spaced apart at an angular spacing of thirty degrees, it is possible to ascertain the amount through which the command knob 19 is operated (i.e., is rotated) by counting the number of pulses in the pulse signal A or in the pulse signal B.

Figure 26:
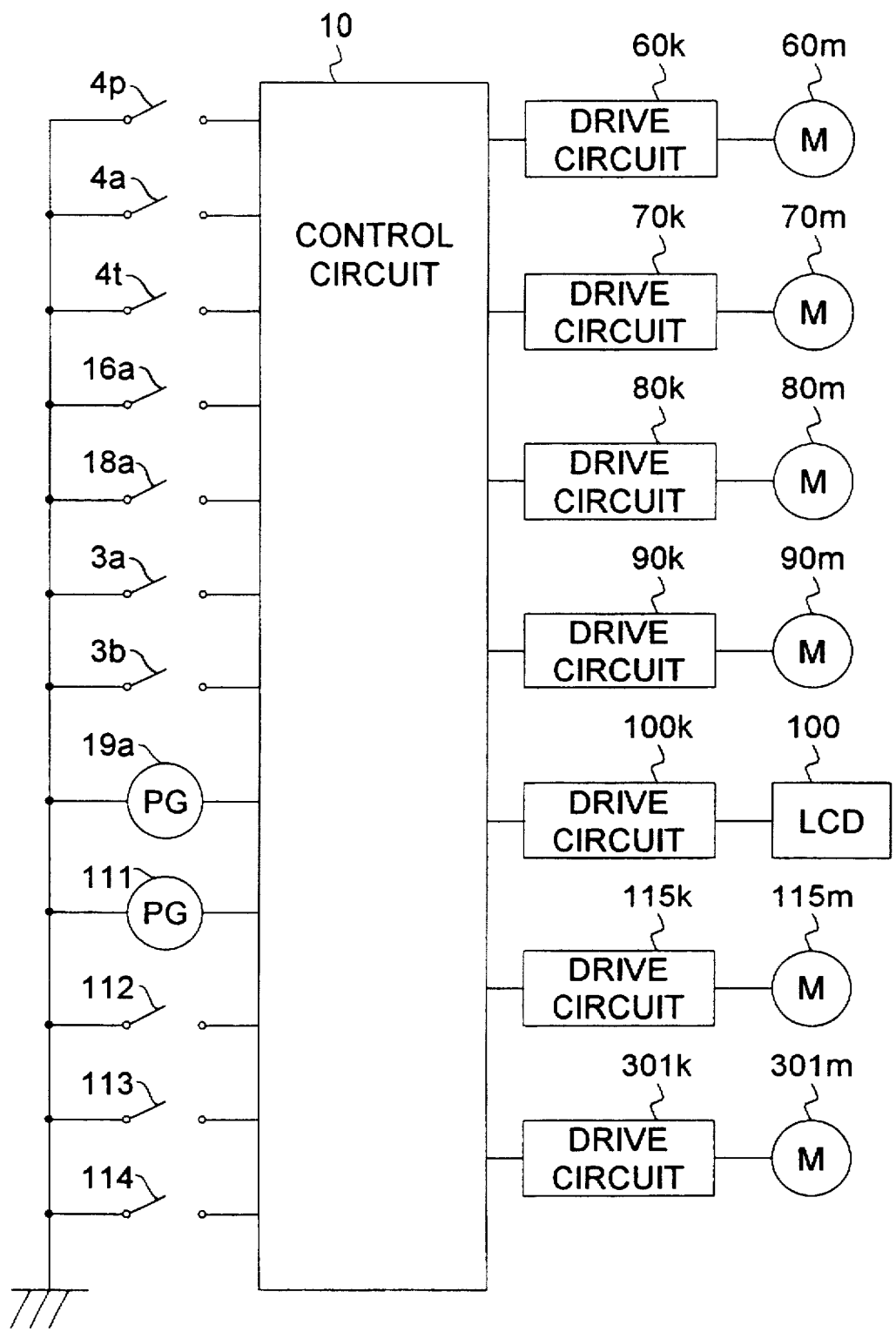
FIG. 26 is a block diagram showing the construction of a control system of a camera which incorporates this third preferred embodiment.

FIG. 26 is a block diagram showing the control system of this camera incorporating the third preferred embodiment of the present invention. To a control circuit 10, as well as various elements which function in the same manner as corresponding elements in the other preferred embodiments described above, there is also connected a drive circuit 301k for a motor 301m which rotationally drives the indicator pointer 301 of the self timer display section 300. This drive circuit 301k is only capable of operating the motor 301m to rotate the indicator pointer 301 in one rotational direction (the clockwise rotational direction in FIG. 23).

Figure 27:
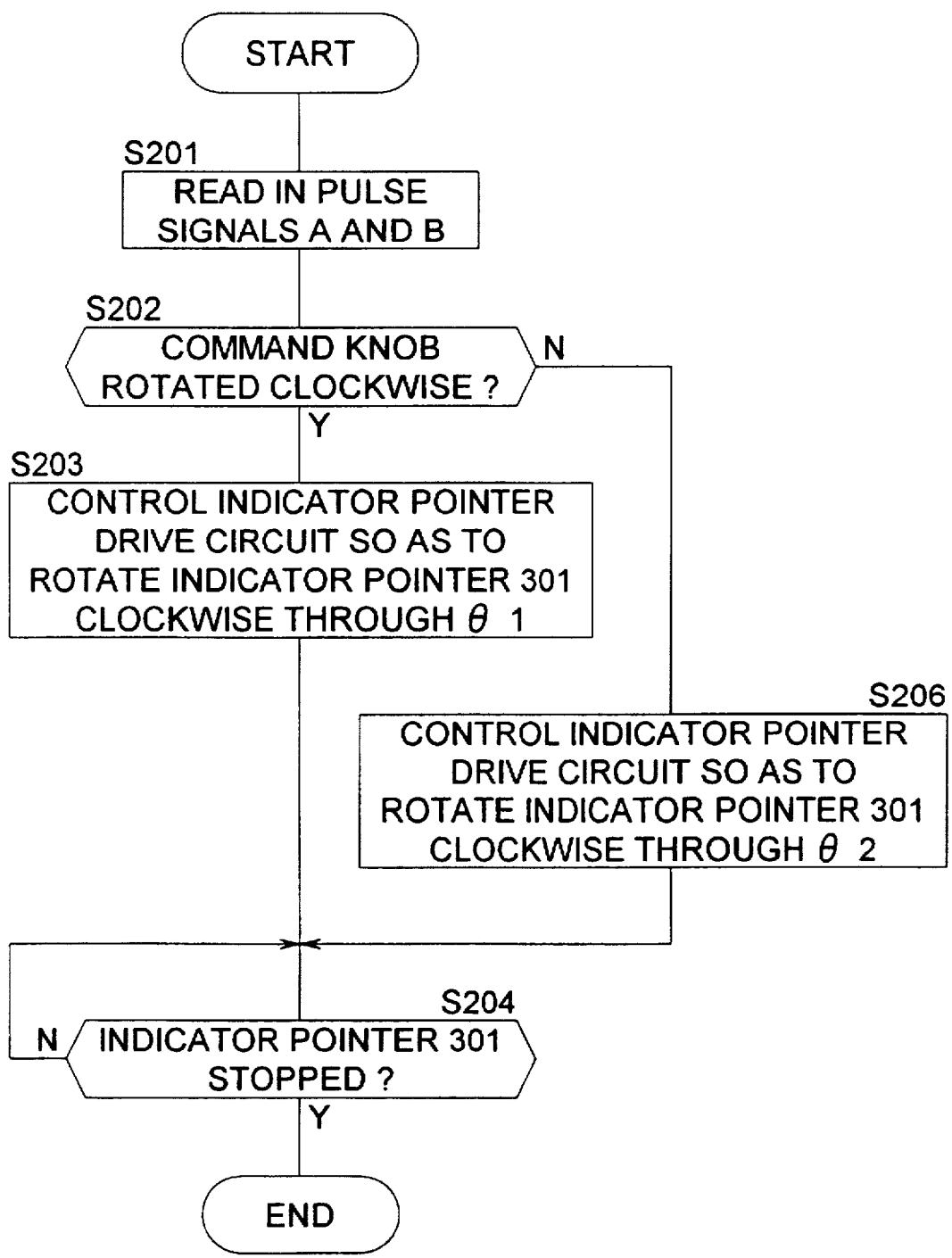
FIG. 27 is a flow chart showing a control routine for self timer setting control for this third preferred embodiment.

FIG. 27 is a flow chart showing a control routine executed by the control circuit 10 of this third preferred embodiment of the present invention for self timer setting control.

If the camera user rotates the command knob 19 while holding down the self timer mode button 17, then when the rotation of the command knob 19 is stopped the microcomputer incorporated in the control circuit 10 starts to execute this control routine. In the step S201 the pulse signals A and B are read in from the pulse signal generator 19a. Further, the number of pulses read in from the pulse signal A or from the pulse signal B is counted, and the rotational angle θ1 through which the command knob 19 has been rotated is calculated from the pulse number count. Supposing that the number of pulses counted in the pulse signal A or in the pulse signal B is n, since one pulse of each of the pulse signals A and B is output each time the command knob 19 is rotated through an angle of thirty degrees, therefore the amount θ1 in degrees through which the command knob 19 has been rotated can be derived from:

θ1=30×n

In the step S202, a decision is made as to whether the command knob 19 has been rotated in the clockwise rotational direction as seen in FIG. 9 or in the anticlockwise rotational direction, based upon the timing of the pulse signals A and B which were input. If it is decided that the command knob 19 has been rotated in the clockwise rotational direction, then the flow of control is transferred to the step S203. In this step S203, the motor 301m is driven via its drive circuit 301k so as to rotate the indicator pointer 301 of the self timer display section 300 in the clockwise rotational direction as seen in FIG. 23 by just the rotational amount θ1 as derived above.

On the other hand, if in the step S202 it is decided that the command knob 19 has been rotated in the anticlockwise rotational direction, then the flow of control is transferred to the step S206. In this step S206, the motor 301m is driven via its drive circuit 301k so as to rotate the indicator pointer 301 of the self timer display section 300, again in the clockwise rotational direction as seen in FIG. 23, but this time by just a rotational amount θ2 in degrees which is derived as follows:

θ2=360−θ1

After the step S203 or the step S206, in either case the flow of control is transferred to the step S204, in which the microprocessor loops around to wait until the rotation of the indicator pointer 301 has terminated. When the rotation of the indicator pointer 301 has stopped, the execution of this routine terminates.

As described above, with this third preferred embodiment of the present invention, when the command knob 19 is rotated in the clockwise rotational direction (i.e. in its forward rotational direction) by just the amount θ1, then the indicator pointer 301 of the self timer display section 300 is driven so as likewise to be rotated in the clockwise rotational direction (i.e. in its forward rotational direction) by just the rotational amount θ1; while on the other hand, when the command knob 19 is rotated in its anticlockwise rotational direction (i.e. in its backward rotational direction) by just the amount θ1, then the indicator pointer 301 is driven so as still to be rotated in the clockwise rotational direction (i.e. still in its forward rotational direction), but this time by just the rotational amount (360 deg −θ1). Accordingly, even in the case in which a display device is used of which the indicator pointer is rotated only in a single rotational direction, it is possible to position the indicator pointer to any desired position with a minimum amount of movement of the command knob 19; in other words, although the indicator pointer is only moved in the one rotational direction, it is not necessary for the user of the camera to confine his operation of the command knob 19 to rotation in one rotational direction, which allows for increased efficiency in operation.

In concrete terms, consider for example the case in which the photographer desires to set the indicator pointer 301 to point to the number "0" but instead mistakenly sets the indicator pointer 301 to point to the number "1". In this case, if a rotating indicator pointer type display device according to the prior art of which the indicator pointer 301 could only be rotated in the one clockwise rotational direction were being used, in order to set the indicator pointer 301 to point to the number "0" again, it would be necessary for the photographer to rotate the command knob 19 through the comparatively large angle of 330 deg in the clockwise rotational direction, which is rather inefficient. On the other hand, in the case of the rotating indicator pointer type display device according to this third preferred embodiment of the present invention, it is only necessary for the photographer to rotate the command knob 19 through the comparatively small angle of 30 deg in the anticlockwise rotational direction, and this will cause the indicator pointer 301 to be rotated in the clockwise rotational direction through the angle of (360 deg −30 deg)=330 deg, so that it now will point to the number "0" as desired. The operation according to the present invention is therefore more efficient.

As an example in the above description it was supposed that, when the command knob 19 was rotated in the anticlockwise rotational direction by just the amount θ1, the indicator pointer 301 was driven so as to be rotated in the clockwise rotational direction by just the rotational amount (360 deg−θ1). However, this is not to be considered as limitative of the present invention, since according to another aspect of the present invention a multiplier factor can be applied for this backwards rotation of the control knob 19, for example by so programming the microprocessor incorporated in the control circuit 10 that, when the command knob 19 is rotated in the anticlockwise rotational direction by just the amount θ1, the indicator pointer 301 is driven so as to be rotated in the clockwise rotational direction by just the rotational amount θ2 derived as follows:

$$\theta 2 = 360 - m \times \theta 1$$

where m is an integer greater than or equal to 2. This provides an operational feeling of "gearing" for backwards rotation of the control knob 19. Here, if the value 360 deg−m×θ1 is less than zero, it is preferable (but not however essential) for the indicator pointer 301 not to be rotated at all.

If for example the above concept is employed with the value of m in the above equation set to 3, then, when the command knob 19 is rotated in the anticlockwise rotational direction for example through the angle of only 30 deg, the indicator pointer 301 is caused to be rotated in the clockwise rotational direction through an angle of (360 deg−3×30 deg)=270 deg. By doing this, if for example the indicator pointer 301 was originally pointing to the number "1", it is rotated so as finally to point to the number "10". In order to bring the indicator pointer 301 to point to the number "0", it will be sufficient further to rotate the command knob 19 through an angle of 60 deg in the clockwise rotational direction.

In other words, as opposed to the case of the value of m being 1 in which the indicator pointer 301 can be rotated to any desired position by rotating the command knob 19 once only, in the case that the value of m is equal to 3 it can happen that it is necessary to rotate the command knob 19 twice in order to position the indicator pointer 301 to the desired position. However, it is possible to reduce the amount of operation of the command knob 19, by comparison with the prior art case in which it was necessary to rotate the command knob 19 through the angle of 330 deg in the anticlockwise direction.

Although in the above description of the various preferred embodiments thereof the rotating indicator pointer type display device of the present invention was discussed in the context of its application to a camera, this is not to be considered as limitative of the present invention. The indicator pointer device of the present invention is capable of being put to other and wider applications—for example, it may be utilized for the adjustment of the hands of a clock, or the like.

In the above described third preferred embodiment of the present invention it was so arranged, by the use of the click spring 235 which provided an indexing action by engaging into the twelve "V" shaped notches 223 through 234 of the plate 236 (see FIG. 24), that the command knob 19 could be set to twelve angular positions spaced apart by an angular interval of 30 deg, but the present invention is not to be considered as limited by these particular details of the construction, since a different number of notches could be used according to the number of angular positions which were required for the command knob to be indexed into, which would naturally be determined according to the fineness of the graduations upon the scale plate which was being used with the command knob. Further, it would also be possible to employ a command knob of a type which was not indexed by any click construction like the notched plate 236 into any set of particular angular positions but which could be rotated continuously to any desired angular position—for example, a capacitive volume control or the like. By doing this, it is possible to set the position of the rotating indicator pointer in detail.

In the above described preferred embodiments of the present invention it was decided by the operating direction of the command knob 19 whether the indicator pointer rotates greater rotational angle or lesser rotational angle, but this is not to be considered as limitative of the present invention: it would also be possible, as an alternative, to provide a switch for choosing whether the indicator pointer rotates greater rotational angle or lesser rotational angle apart from command knob. In this case, it is acceptable for command knob to rotate in one direction only. Further, instead of a rotatable knob, it would also be acceptable to provide a switch which was operated by being pressed a variable number of times in order to specify the amount of angular rotation of the indicator pointer; or alternatively it would be possible to utilize a sliding type operating device which could be operated by being slide in either of two directions.

In the above described third preferred embodiment of the present invention it was specified that the numbers (1 through 12) upon the scale plate of the self timer mode section 4 and the number (12) of grooves on the plate 236 i.e. the number of click positions for the command knob 19 were in agreement, but this is not a necessary feature of the present invention: they do not need to be in agreement. For example, it would be acceptable in the above described third preferred embodiment for twenty-four grooves on the plate 236 to be provided at angular intervals of 15 deg, and in this case, by setting the value of m in the above equation to 2, it is possible to ensure that the device operates substantially identically to the case in which the value of m is set to 1, with twelve grooves on the plate 236 being provided at angular intervals of 30 deg as described previously. Further, it is also an acceptable variation, when the command knob is rotated in its forward rotational direction through an angle of just θ, to rotate the indicator pointer of the display device in the clockwise rotational direction through an angle of c1×θ, where c1 is a constant value; and, when the command knob is rotated in its backward rotational direction through an angle of just θ, to rotate the indicator pointer of the display device in the clockwise rotational direction through an angle of (360 deg−c2×θ), where c2 is a constant value that is not necessarily the same as c1.

Figure 28:
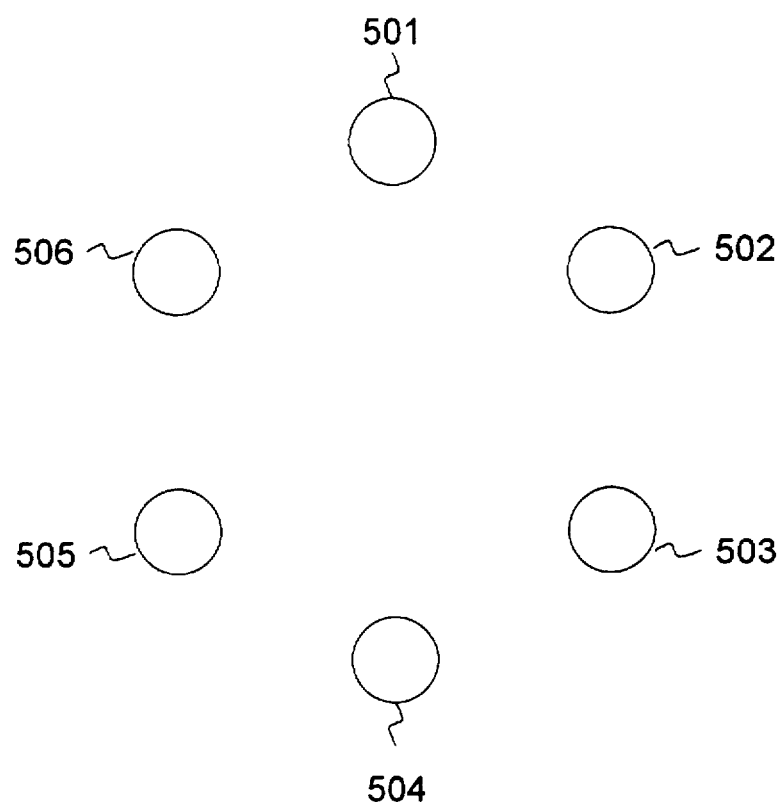
FIG. 28 is a figure showing a display apparatus according to a variant embodiment.

Further, it would be acceptable to display the rotating indicator pointer and the dial on a liquid crystal display device. Furthermore, in above described embodiments some examples using a rotating indicator pointer type display were shown, but the display apparatus of the present invention is not limited to the indicator pointer type one. FIG. 28 shows another type display apparatus using a plurality of indications 501–506 made of LEDs. LEDs 501–506 are respectively corresponding to photographic modes of a camera for example, and only one of LEDs 501–506 which correspond to the current photographic mode is turned on. Whenever an operating member of the camera such as the above described command knob is rotationally operated, the turned on LED is changed by one in the clockwise direction whichever be the direction of the operation of the operating member. Whenever the turned on LED is changed, photographic mode is changed to the mode corresponding to the turned on LED.

We claim:

1. A rotating indicator pointer type display apparatus comprising:
    a display device having a dial and a rotating indicator pointer which rotates in one rotational direction only over the dial and which displays information by said rotating indicator pointer pointing at one of a plurality of indicators on said dial;
    an operating device which is capable of being operated in a first direction and a second direction for rotating said indicator pointer; and
    a drive control device which, when said operating device is operated in said first direction, rotationally drives said rotating indicator pointer of said display device through a first rotational angle, wherein the greater the amount said operating device is operated in the first direction, the larger the first rotational angle and, when said operating device is operated in said second direction, rotationally drives said rotating indicator pointer of said display device through a second rotational angle, the greater the amount said operating device is operated in the second direction, the smaller the second rotational angle.

2. A rotating indicator pointer type display apparatus according to claim 1, wherein said drive control device comprises a source of driving electrical power and a drive force transmission mechanism which transmits a drive force from said source of driving electrical power to said indicator pointer to rotationally drive said indicator pointer.

3. A rotating indicator pointer type display apparatus according to claim 1, wherein said display device is mounted upon a main body of a camera, and displays information related to photography by rotationally driving said indicator pointer.

4. A rotating indicator pointer type display apparatus according to claim 3, wherein, according to the amount by which said operating device is operated, said drive control device rotationally drives said indicator pointer to display a number of self timer film frames.

5. A rotating indicator pointer type display apparatus according to claim 1, wherein said operating device is a rotatable member which can be rotated, and wherein said first direction and said second direction comprise a forward direction and a backward direction, respectively.

6. A rotating indicator pointer type display apparatus according to claim 5, wherein said drive control device, when said operating device is rotated in the forward direction, rotationally drives said rotating indicator pointer of said display device through a first rotational angle, the first rotational angle being larger the greater the amount said operating device is rotated in the forward direction and, when said operating device is rotated in the backward direction, rotationally drives said rotating indicator pointer of said display device through a second rotational angle, the second rotational angle being smaller the greater the amount said operating device is rotated in the backward direction.

7. A rotating indicator pointer type display apparatus according to claim 6, wherein said drive control device, when said operating device is rotated in the forward direction through an angle of $\theta$ degrees, rotationally drives said rotating indicator pointer of said display device through a rotational angle of substantially $c \times \theta$ degrees, where c is a constant and, when said operating device is rotated in the backward direction through an angle of $\theta$ degrees, rotationally drives said rotating indicator pointer of said display device through a rotational angle of substantially $(360-c \times \theta)$ degrees.

8. A rotating indicator pointer type display apparatus according to claim 6, wherein said drive control device when said operating device is rotated in the forward direction through an angle of $\theta$ degrees, rotationally drives said rotating indicator pointer of said display device through a rotational angle of substantially $\theta$ degrees and, when said operating device is rotated in the backward direction through an angle of $\theta$ degrees, rotationally drives said rotating indicator pointer of said display device through a rotational angle of substantially $360-\theta$ degrees.

9. A rotating indicator pointer type display apparatus according to claim 6, wherein said drive control device, when said operating device is rotated forward through an angle of $\theta$ degrees, rotationally drives said rotating indicator pointer of said display device through a rotational angle of substantially $\theta$ degrees and, when said operating device is rotated in the backward direction through an angle of $\theta$ degrees, rotationally drives said rotating indicator pointer of said display device through a rotational angle of substantially $360-n \times \theta$ degrees, where n is an integer greater than or equal to 2.

10. A camera fitted with a rotating indicator pointer type display apparatus comprising:
    a display device, having an indicator pointer which rotates in one rotational direction only, and a scale which is inscribed with indications denoting a number of self timer film frames, said indications being disposed proximate to a track of said indicator pointer as said indicator pointer rotates, said display device displaying a number of film frames through said rotating indicator pointer pointing at one of said scale indications;
    an operating device which is capable of being rotated in a forward direction and in a backward direction for rotating said indicator pointer;
    a drive control device which, when said operating device is rotated in the forward direction through an angle of $\theta$ degrees, rotationally drives said rotating indicator pointer of said display device through a rotational angle of substantially $\theta$ degrees and, when said operating device is rotated in the backward direction through an angle of $\theta$ degrees, rotationally drives said rotating indicator pointer of said display device through a rotational angle of substantially $360-\theta$ degrees; and
    a setting device which sets the number denoted by the indication at which said rotating indicator pointer is actually pointing as a number of self timer film frames.

11. A camera according to claim 10, wherein said drive control device comprises a source of driving electrical power and a drive force transmission mechanism which transmits a drive force from said source of driving electrical power to said indicator pointer to rotationally drive said indicator pointer.

12. A rotating indicator pointer type display apparatus comprising:
    an indicator pointer which rotates in one rotational direction only;
    film frame number indications denoting a number of film frames already photographed disposed proximate to a track of said indicator pointer as said indicator pointer rotates;
    an indication denoting a film rewinding operation also disposed proximate to the track of said indicator pointer;
    an indication denoting a film not loaded state also disposed proximate to the track of said indicator pointer; and a drive control device, which, whenever photography takes place, rotationally drives said indicator pointer so that said indicator pointer points at the appropriate one of said film frame number indications which denotes the current number of film frames already photographed, which, when an order is given for film rewinding, rotationally drives said indicator pointer so that said indicator pointer points at said indication which denotes a film rewinding operation, and which, when film rewinding is complete, rotationally drives said indicator pointer so that said indicator pointer points at said indication which denotes a film not loaded state.

13. A rotating indicator pointer type display apparatus according to claim 12, wherein said indications denoting the number of film frames already photographed, said indication denoting a film rewinding operation, and said indication denoting a film not loaded state are all arranged in this order in the direction of rotation of said indicator pointer proximate to the track of said indicator pointer.

14. A rotating indicator pointer type display apparatus according to claim 13, wherein said drive control device, when film is loaded, rotationally drives said indicator pointer from its position in which said indicator pointer was pointing at said indication which denotes a film not loaded state to a position in which said indicator pointer points at one of said indications denoting the number of film frames already photographed which denotes "zero".

15. A rotating indicator pointer type display apparatus comprising:

an indicator pointer which rotates in one rotational direction only;

indications denoting film frame numbers disposed proximate to a track of said indicator pointer as said indicator pointer rotates;

indications denoting a number of film frames remaining to be rewound disposed proximate to the track of said indicator pointer and a drive control device, which, whenever photography takes place, rotationally drives said indicator pointer so that said indicator pointer points at the appropriate one of said indications which denotes the current number of film frames already photographed, and which, during film rewinding, rotationally drives said indicator pointer so that said indicator pointer points at the appropriate one of said remaining film frames indications which denotes the current number of film frames remaining to be rewound.

16. A rotating indicator pointer type display apparatus according to claim 15, further comprising an indication denoting a film not loaded state, also disposed proximate to the track of said indicator pointer, and wherein said drive control device, when film rewinding is complete, rotationally drives said indicator pointer so that said indicator pointer points at said indication which denotes a film not loaded state.

17. A rotating indicator pointer type display apparatus according to claim 16, wherein said indications denoting film frame numbers said indications denoting a number of film frames remaining to be rewound, and said indication denoting a film not loaded state are all arranged in this order in the direction of rotation of said indicator pointer proximate to the track of said indicator pointer.

18. A rotating indicator pointer type display apparatus according to claim 17, wherein said drive control device, when a film is loaded, rotationally drives said indicator pointer from a position in which said indicator pointer was pointing at said indication which denotes a film not loaded state to a position in which said indicator pointer points at one of said indications denoting film frame numbers which denotes "zero".

19. A rotating indicator pointer type display apparatus comprising:

a display means having a rotating indicator pointer which rotates in one rotational direction only over a dial, for displaying information by said rotating indicator pointer pointing at one of a plurality of indications on said dial;

an operating means which is capable of being operated in a first direction and a second direction for rotating said indicator pointer; and:

a drive control means for, when said operating means is operated in said first direction, rotationally driving said rotating indicator pointer of said display means through a first rotational angle, the greater the amount said operating means is operated in the first direction, the greater the first rotational angle and, when said operating means is operated in said second direction, rotationally driving said rotating indicator pointer of said display means through a second rotational angle, the greater the amount said operating means is operated in said second direction, the smaller the second rotational angle.

20. A camera fitted with a rotating indicator pointer type display apparatus comprising:

a display means having an indicator pointer which rotates in one rotational direction only, and a scale which is inscribed with indications denoting a number of self timer film frames, said indications being disposed proximate to a track of said indicator pointer as said indicator pointer rotates, said display means displaying a number of self timer film frames through said rotating indicator pointer pointing at one of said scale indications;

an operating means which is capable of being rotated in a forward direction and in a backward direction for rotating said indicator pointer;

a drive control means for, when said operating means is rotated in the forward direction through an angle of θ degrees, rotationally driving said rotating indicator pointer of said display means through a rotational angle of substantially θ degrees and, when said operating means is rotated in the backward direction through an angle of θ degrees, rotationally driving said rotating indicator pointer of said display means through a rotational angle of substantially 360−θ degrees; and a setting means for setting the number denoted by the indication at which said rotating indicator pointer is actually pointing as a number of self timer film frames.

21. A rotating indicator pointer type display apparatus comprising:

an indicator pointer which rotates in one rotational direction only;

indications denoting a number of film frames already photographed, said indications being disposed proximate to a track of said indicator pointer as said indicator pointer rotates;

indications denoting a number of film frames remaining to be rewound, disposed proximate to the track of said indicator pointer; and a drive control means for, whenever photography takes place, rotationally driving said indicator pointer so that said indicator pointer points at the appropriate one of said film frame number indications which denotes the current number of film frames already photographed, and for, during film rewinding, rotationally driving said indicator pointer so that said indicator pointer points at the appropriate one of said remaining film frames indications which denotes the current number of film frames remaining to be rewound.

* * * * *